(12) United States Patent
Hwang et al.

(10) Patent No.: US 9,420,088 B2
(45) Date of Patent: Aug. 16, 2016

(54) MOBILE TERMINAL AND CONTROLLING METHOD THEREOF

(71) Applicant: LG ELECTRONICS INC., Seoul (KR)

(72) Inventors: Keumsung Hwang, Seoul (KR); Mihyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/597,991

(22) Filed: Jan. 15, 2015

(65) Prior Publication Data

US 2016/0014258 A1 Jan. 14, 2016

(30) Foreign Application Priority Data

Jul. 9, 2014 (KR) ........................ 10-2014-0085930

(51) Int. Cl.
*H04W 4/00* (2009.01)
*H04M 1/725* (2006.01)
*H04W 68/00* (2009.01)

(52) U.S. Cl.
CPC ...... *H04M 1/72547* (2013.01); *H04M 1/72519* (2013.01); *H04M 1/72544* (2013.01); *H04W 68/005* (2013.01); *H04M 1/7253* (2013.01); *H04M 1/72569* (2013.01); *H04M 2250/02* (2013.01); *H04M 2250/22* (2013.01)

(58) Field of Classification Search
CPC ............... H04M 1/72547; H04M 1/72519; H04M 1/7253; H04M 1/72569; H04M 1/72544; H04M 2250/02; H04M 2250/22; H04W 68/005
USPC ............... 455/435.1, 418, 456.1, 456.3, 550.1
See application file for complete search history.

(56) References Cited

U.S. PATENT DOCUMENTS

| | | | |
|---|---|---|---|
| 7,538,745 B2 * | 5/2009 | Borovoy | G08B 1/08 345/649 |
| 2004/0248569 A1 | 12/2004 | Kondou et al. | |
| 2006/0053377 A1 | 3/2006 | Newell et al. | |
| 2007/0281689 A1 * | 12/2007 | Altman | G06Q 30/0207 455/435.1 |
| 2008/0280627 A1 * | 11/2008 | Moran | H04M 1/2745 455/456.1 |
| 2008/0318592 A1 * | 12/2008 | Mandalia | H04M 3/42263 455/456.1 |
| 2011/0296308 A1 | 12/2011 | Yi | |
| 2012/0115435 A1 | 5/2012 | Oren | |
| 2014/0195256 A1 * | 7/2014 | Wagner | G06Q 50/22 705/2 |

* cited by examiner

*Primary Examiner* — Khai M Nguyen
(74) *Attorney, Agent, or Firm* — Birch, Stewart, Kolasch & Birch, LLP

(57) ABSTRACT

A mobile terminal including a touchscreen configured to output at least one display object; a wireless communication unit configured to transceive data with at least one external terminal; and a controller configured to identify, via the wireless communication unit, a first external terminal existing within a predetermined communication distance from the mobile terminal, display a first display object in a first mode on the touch screen, when the first external terminal exists within the predetermined communication distance, and display the first display object on the touchscreen in a second mode when the first external terminal is no longer within the predetermined communication distance. Further, the first mode includes altering at least some of the information output with the first display object compared with the information output with the second mode.

18 Claims, 24 Drawing Sheets

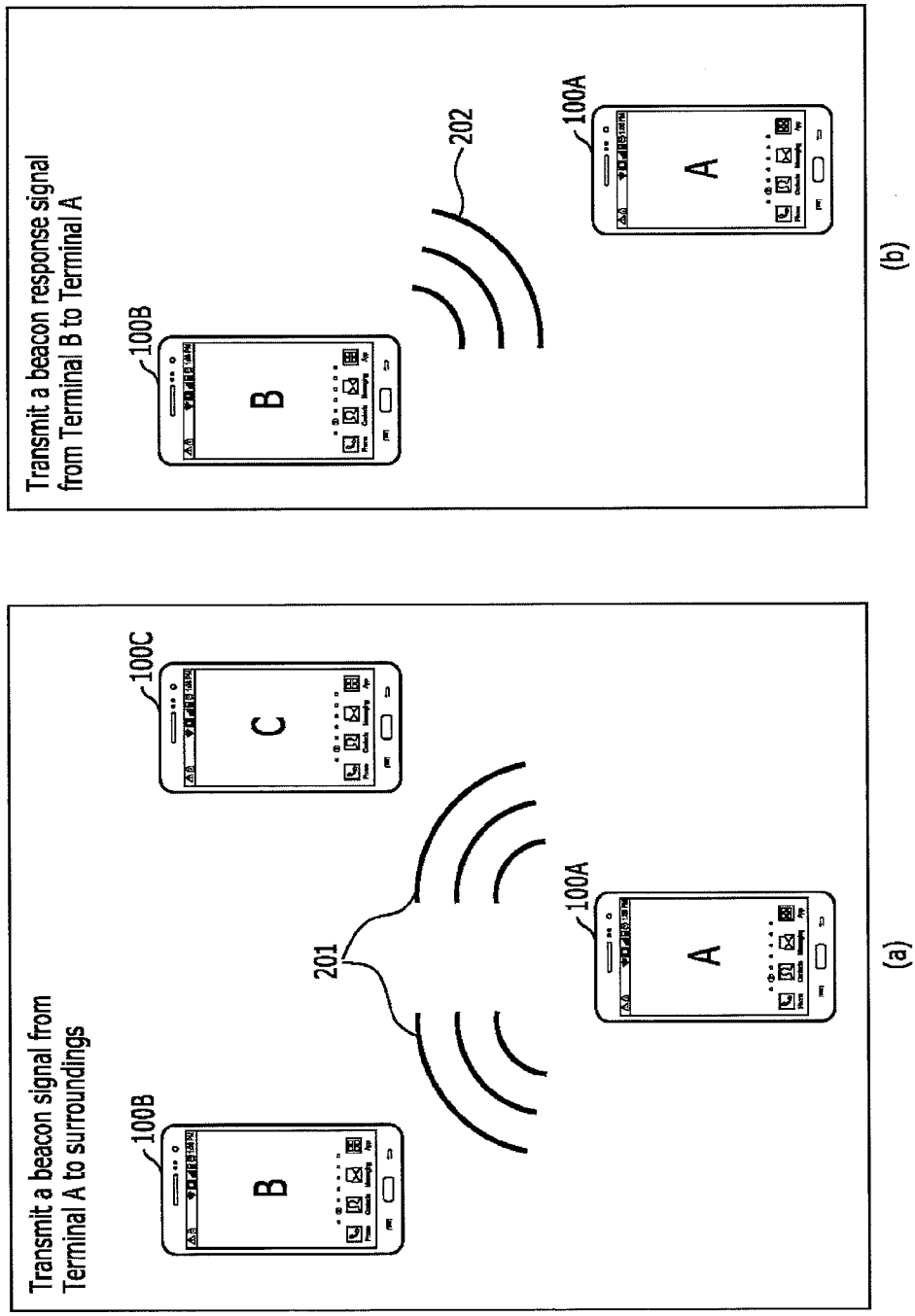

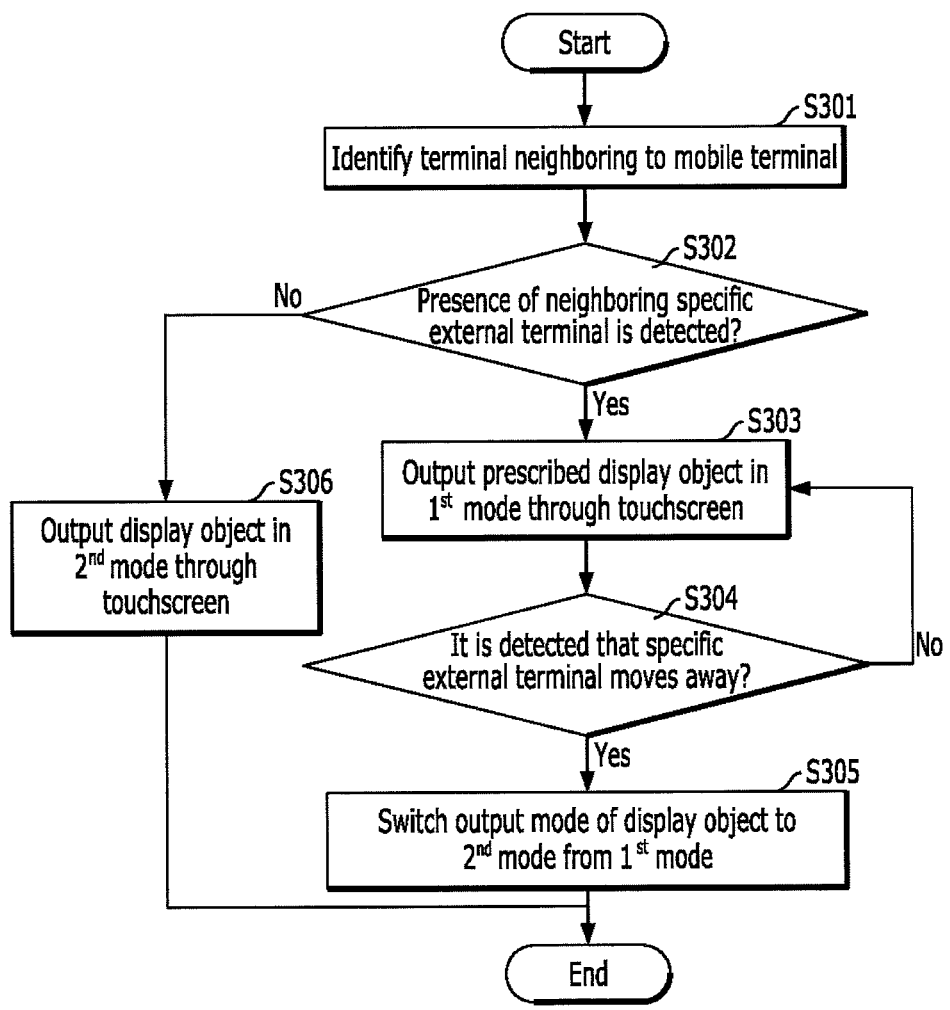

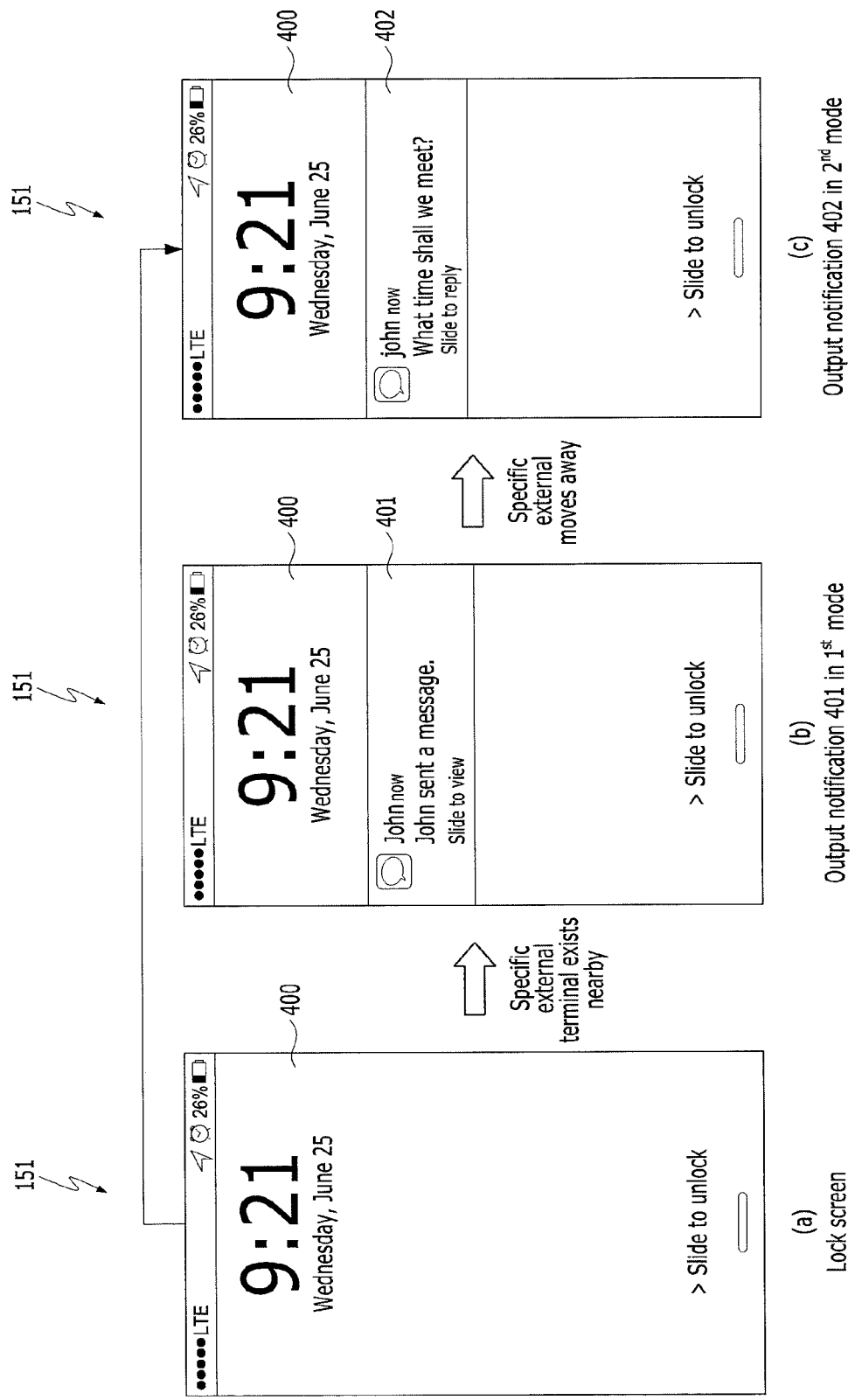

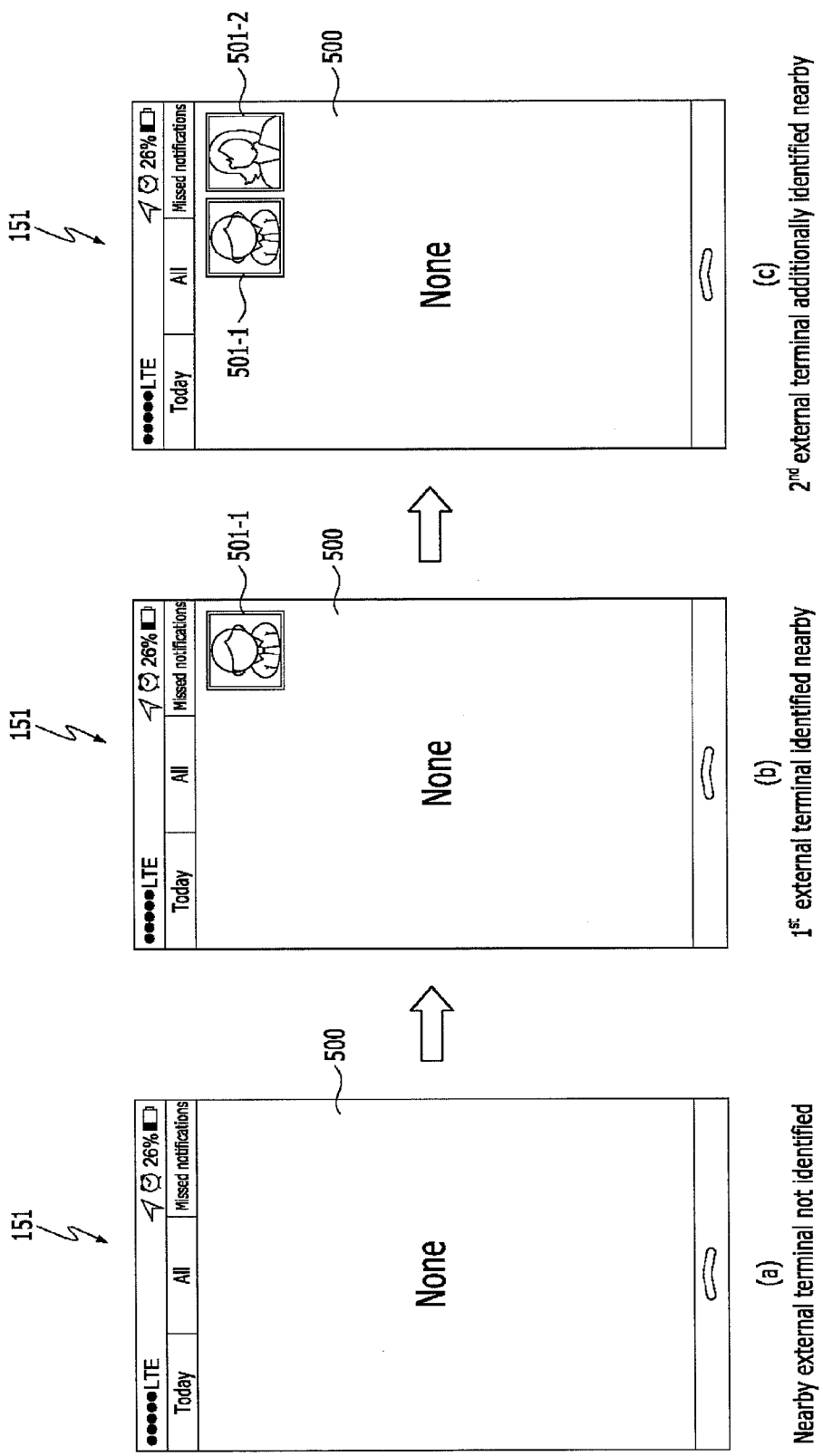

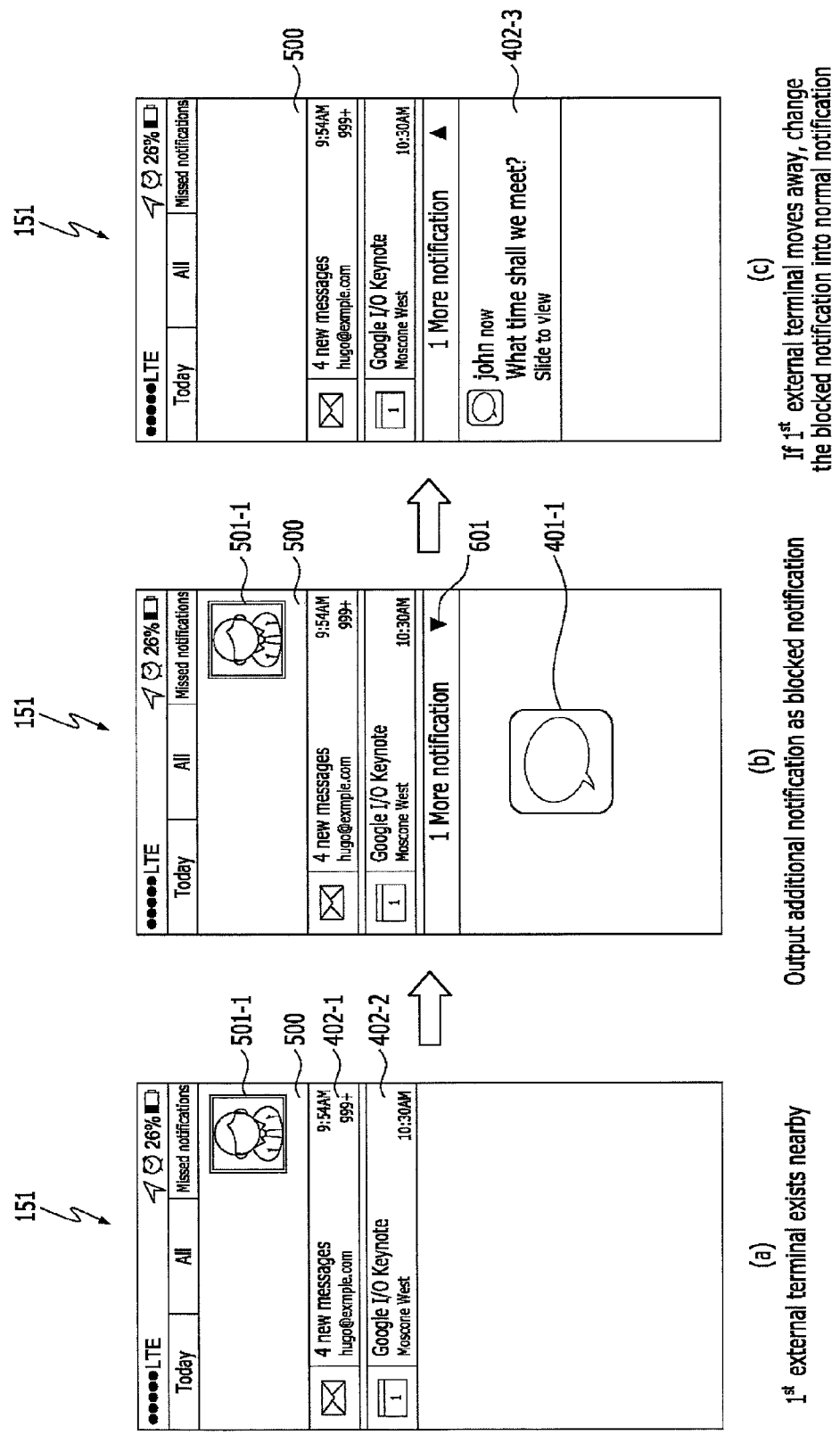

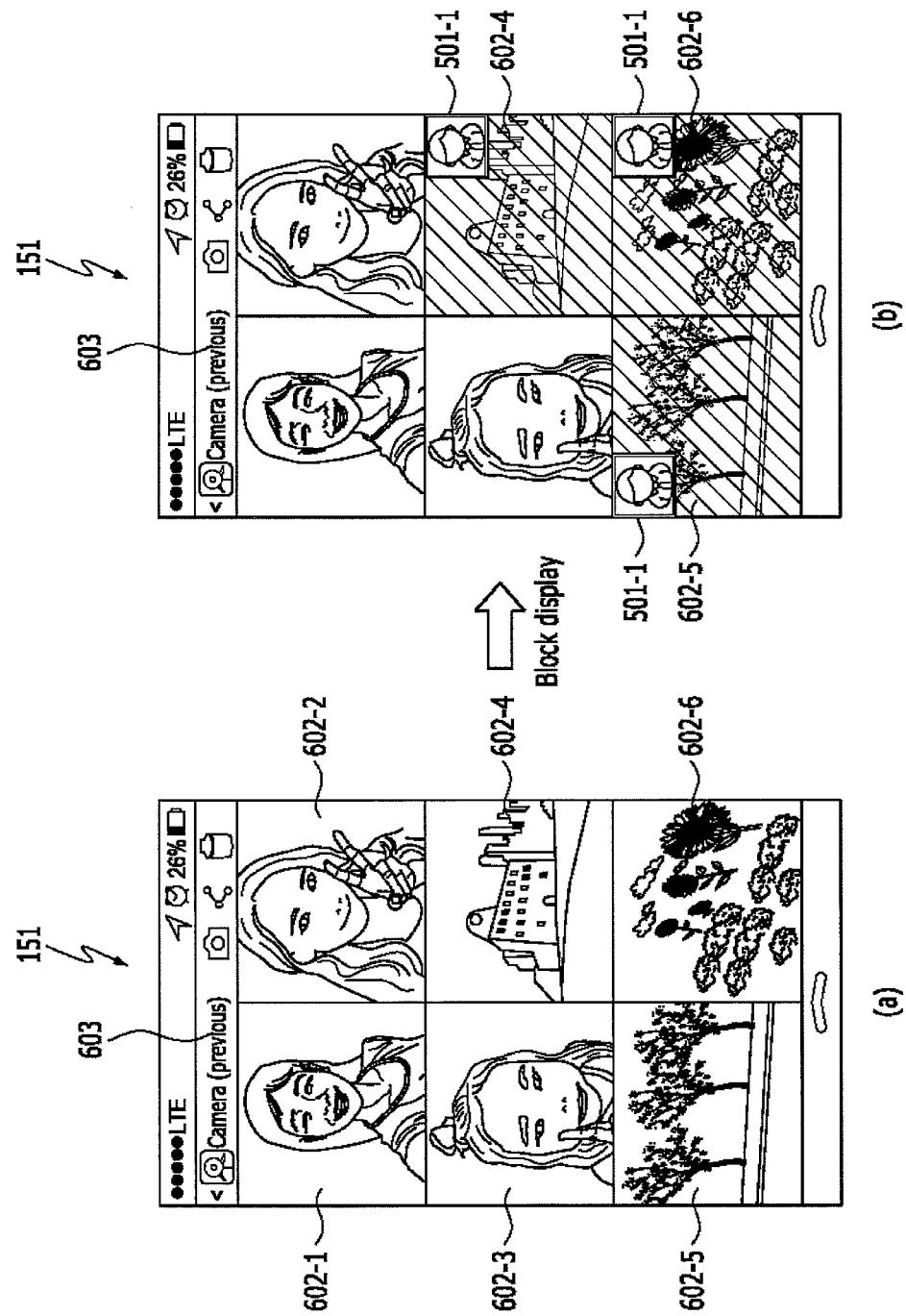

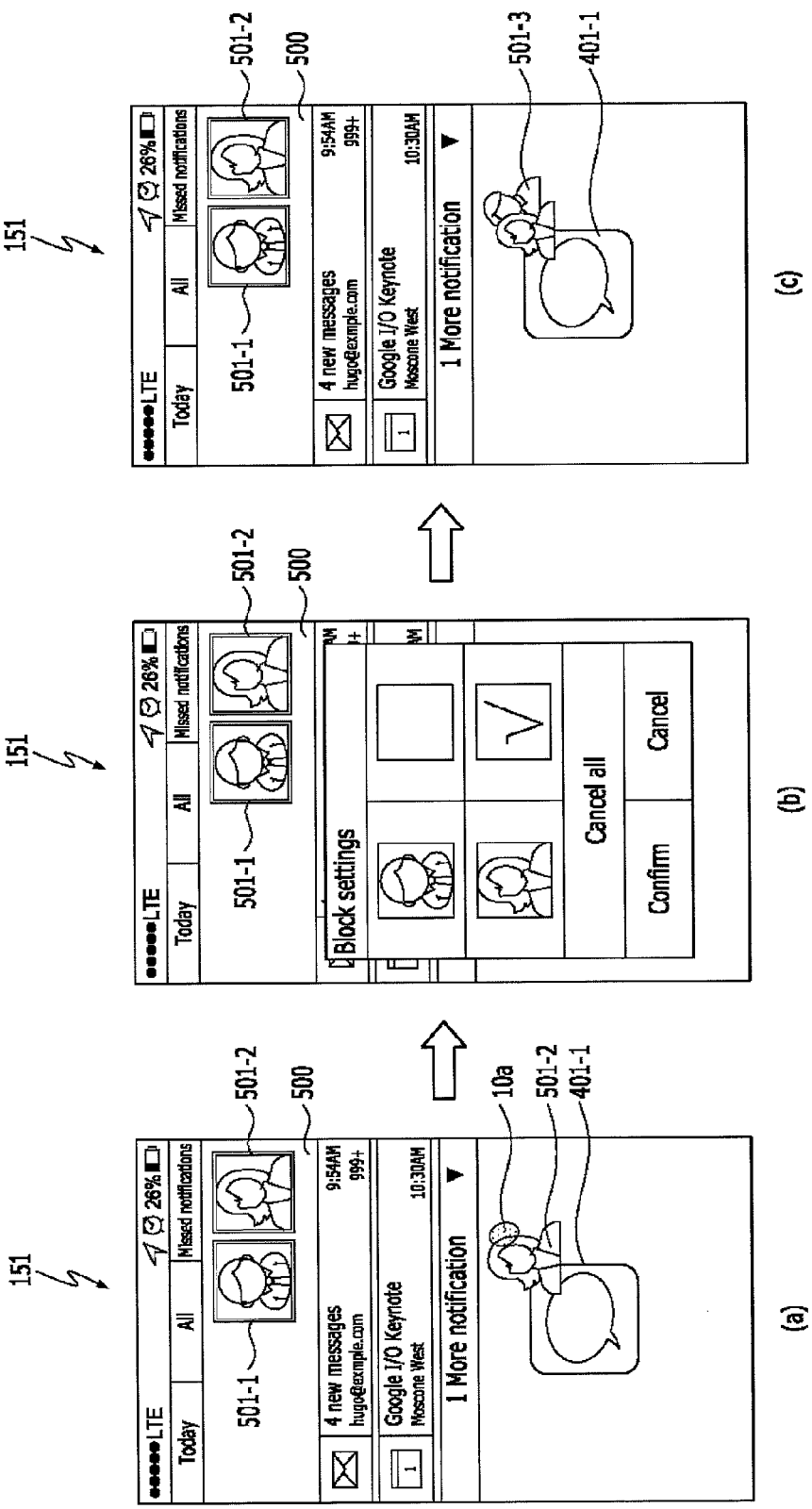

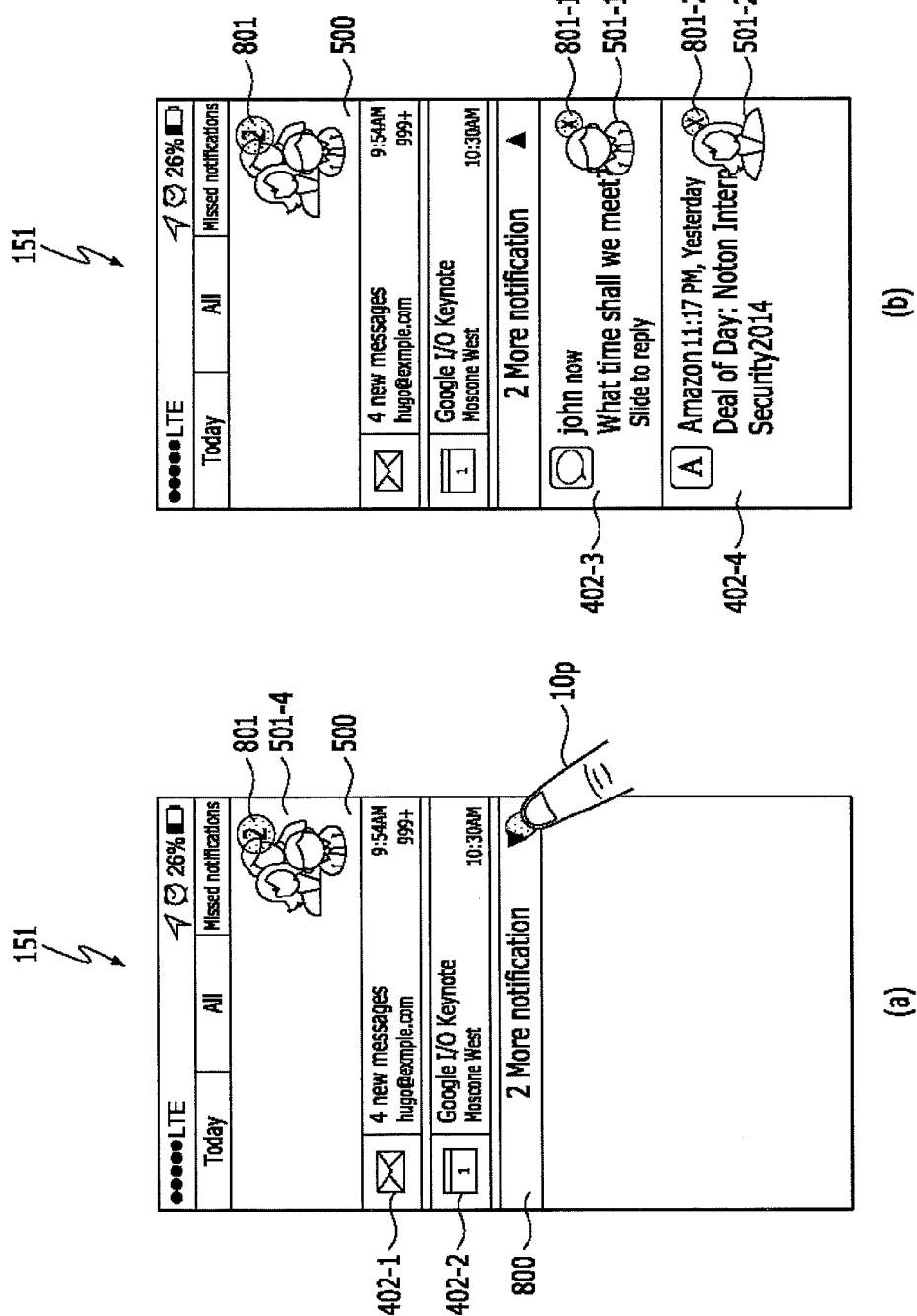

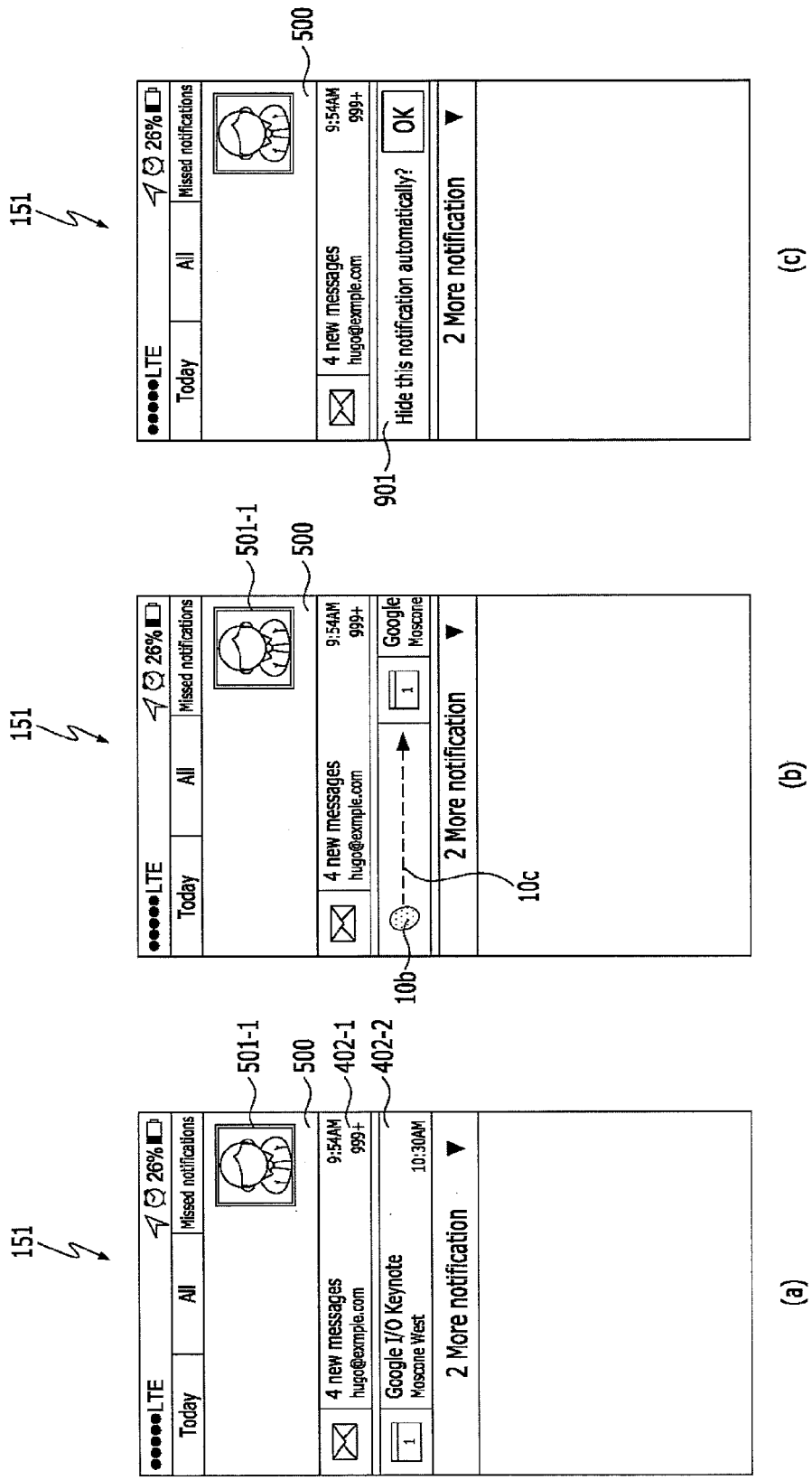

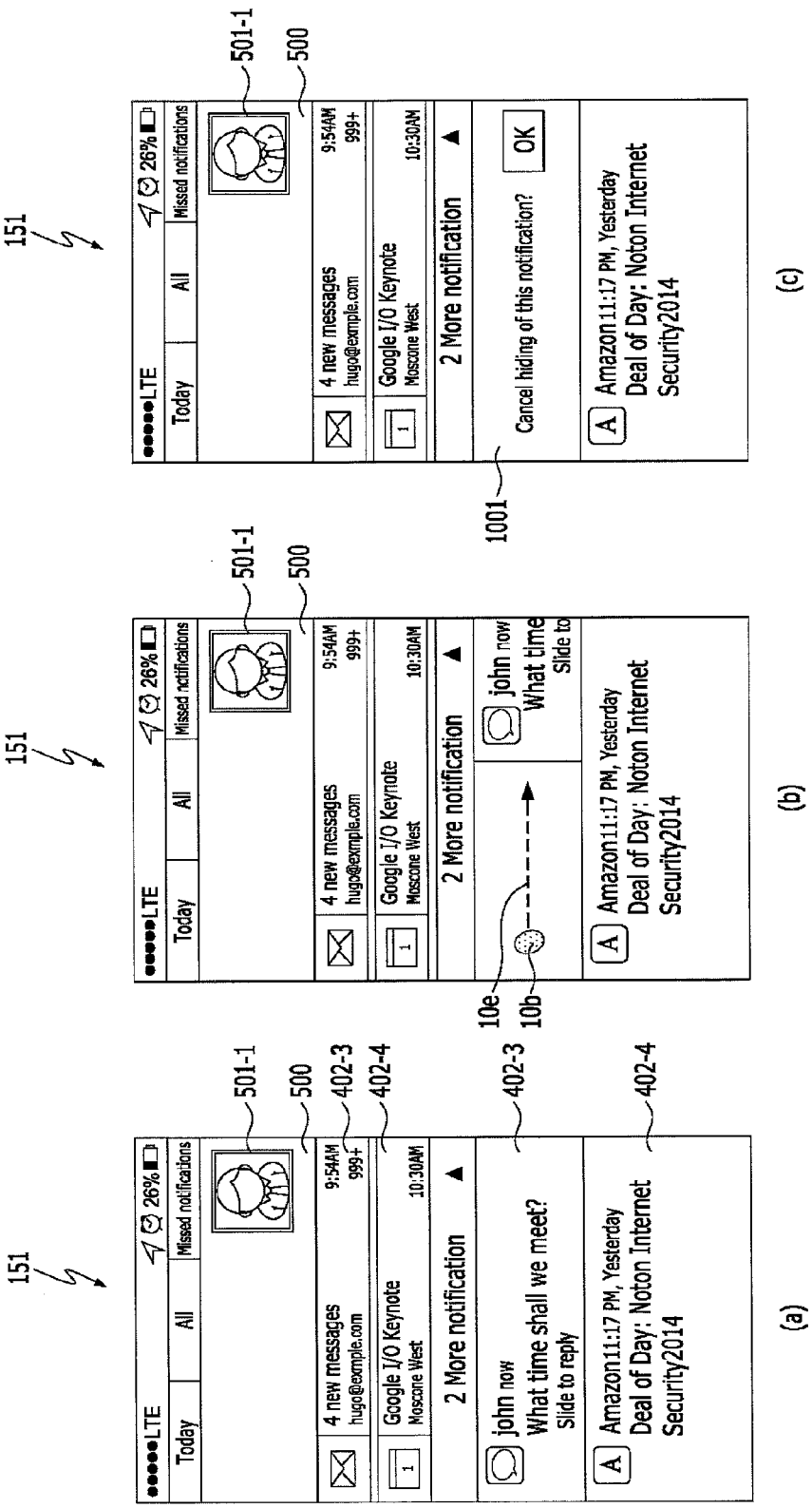

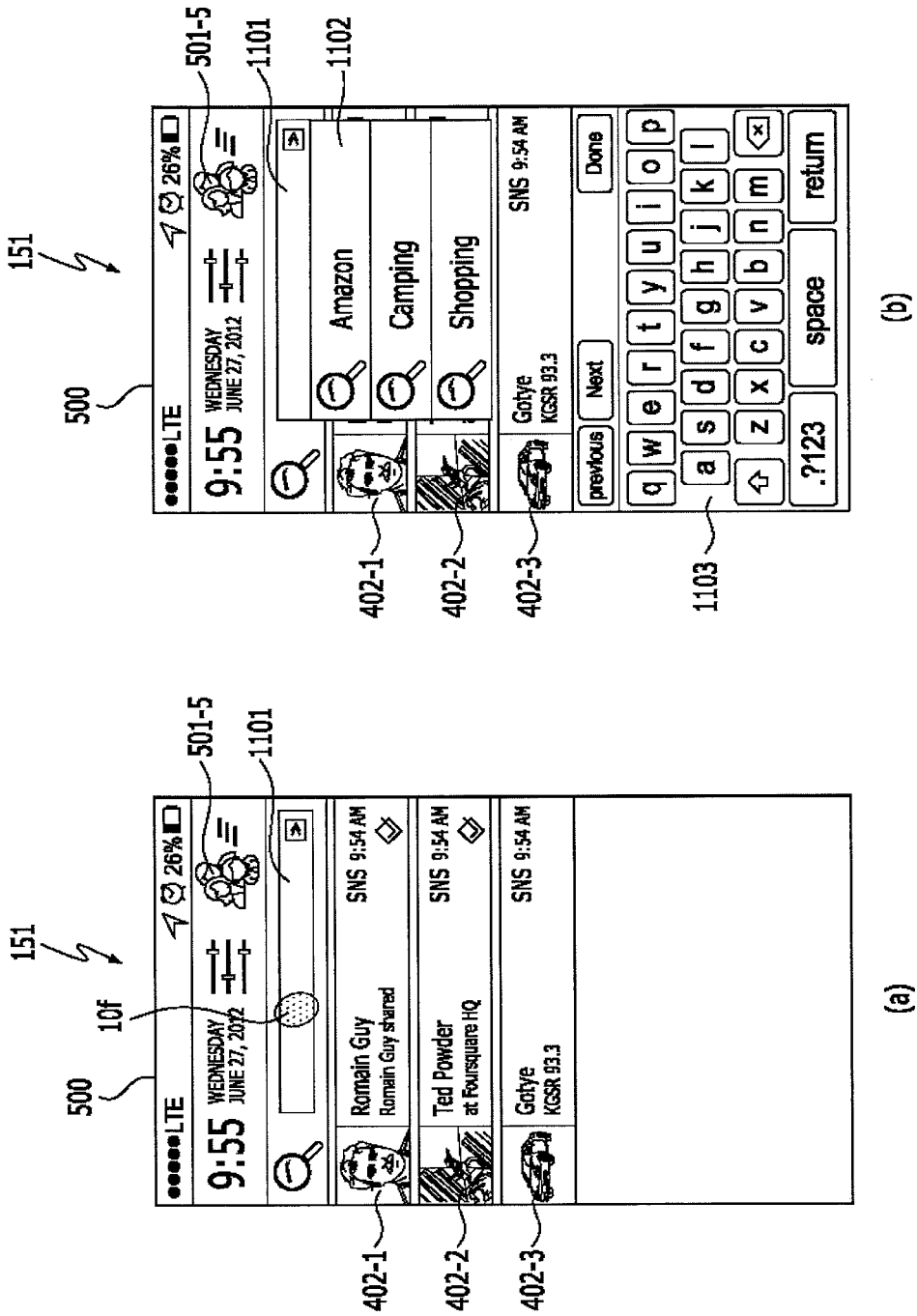

MOBILE TERMINAL AND CONTROLLING METHOD THEREOF

Pursuant to 35 U.S.C. §119(a), this application claims the benefit of earlier filing date and right of priority to Korean Application No. 10-2014-0085930, filed on Jul. 9, 2014, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs. Generally, terminals can be classified into mobile terminals and stationary terminals. In addition, the mobile terminals can be further classified into handheld terminals and vehicle mounted terminals.

If a specific condition is met, a terminal provides notification to a user. For instance, if a user receives a text message, a terminal outputs a notification to inform the user that the text message is received. However, although the notification is output in various and complicated ways, a notification outputting method and a notification outputting timing point are standardized. Thus, since a notification may be output in an inappropriate situation, the demand for a method of controlling a notification to be output appropriately is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a notification adaptive to an identified external terminal can be output by identifying external terminals neighboring to the mobile terminal.

To achieve these objects and other advantages and in accordance with the purpose of the invention, as embodied and broadly described herein, a mobile terminal according to one embodiment of the present invention may include a touchscreen configured to output at least one display object, a wireless communication unit configured to transceive data with at least one external terminal, and a controller controlling the wireless communication unit to identify an external terminal existing nearby, the controller, if a first external terminal exists nearby as a result of the identification, outputting a first display object in a first mode, the controller, if the first external terminal does not exist nearby, outputting the first display object in a second mode.

In another aspect of the present invention, as embodied and broadly described herein, a method of controlling a mobile terminal according to another embodiment of the present invention may include the steps of outputting at least one display object through a touchscreen, transceiving data with at least one external terminal, identifying an external terminal existing nearby, if a $1^{st}$ external terminal exists nearby as a result of the identification, outputting a $1^{st}$ display object in a $1^{st}$ mode, and if the $1^{st}$ external terminal does not exist nearby as the result of the identification, outputting the $1^{st}$ display object in a $2^{nd}$ mode.

It is to be understood that both the foregoing general description and the following detailed description of the preferred embodiments of the present invention are and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 2 is a diagram illustrating one example of a controlling method of transmitting a beacon signal to recognize an external terminal according to one embodiment of the present invention;

FIG. 3 is a flowchart of a controlling method of identifying a neighbor external terminal and then changing a display mode of a display object in accordance with the identified external terminal according to one embodiment of the present invention;

FIG. 4 is a diagram illustrating one example to describe a controlling method of identifying a neighbor external terminal and then changing a display mode of a display object in accordance with the identified external terminal according to one embodiment of the present invention;

FIG. 5 is a diagram illustrating one example to describe a controlling method of notifying that a specific neighbor external terminal is identified according to one embodiment of the present invention;

FIG. 6A is a diagram illustrating one example of a notification displayed in different mode on a notification window;

FIG. 6B is a diagram illustrating one example of a controlling method of blocking a displayed content depending on a recognized neighbor external terminal according to one embodiment of the present invention;

FIG. 7 is a diagram illustrating one example of a controlling method of displaying a character on a block indicator according to one embodiment of the present invention;

FIG. 8 is a diagram illustrating one example of a controlling method of skipping an output of a notification when detecting a neighbor external terminal according to one embodiment of the present invention;

FIG. 9 and FIG. 10 are diagrams illustrating examples of a controlling method of facilitating a block setting based on a touch gesture input to a notification indicator according to one embodiment of the present invention;

FIG. 11 is a diagram illustrating one example of a controlling method of recommending a search keyword based on a recognized neighbor external terminal according to one embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and the embodiments presented herein are not limited by the accompanying drawings. As such, the present invention should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present. A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
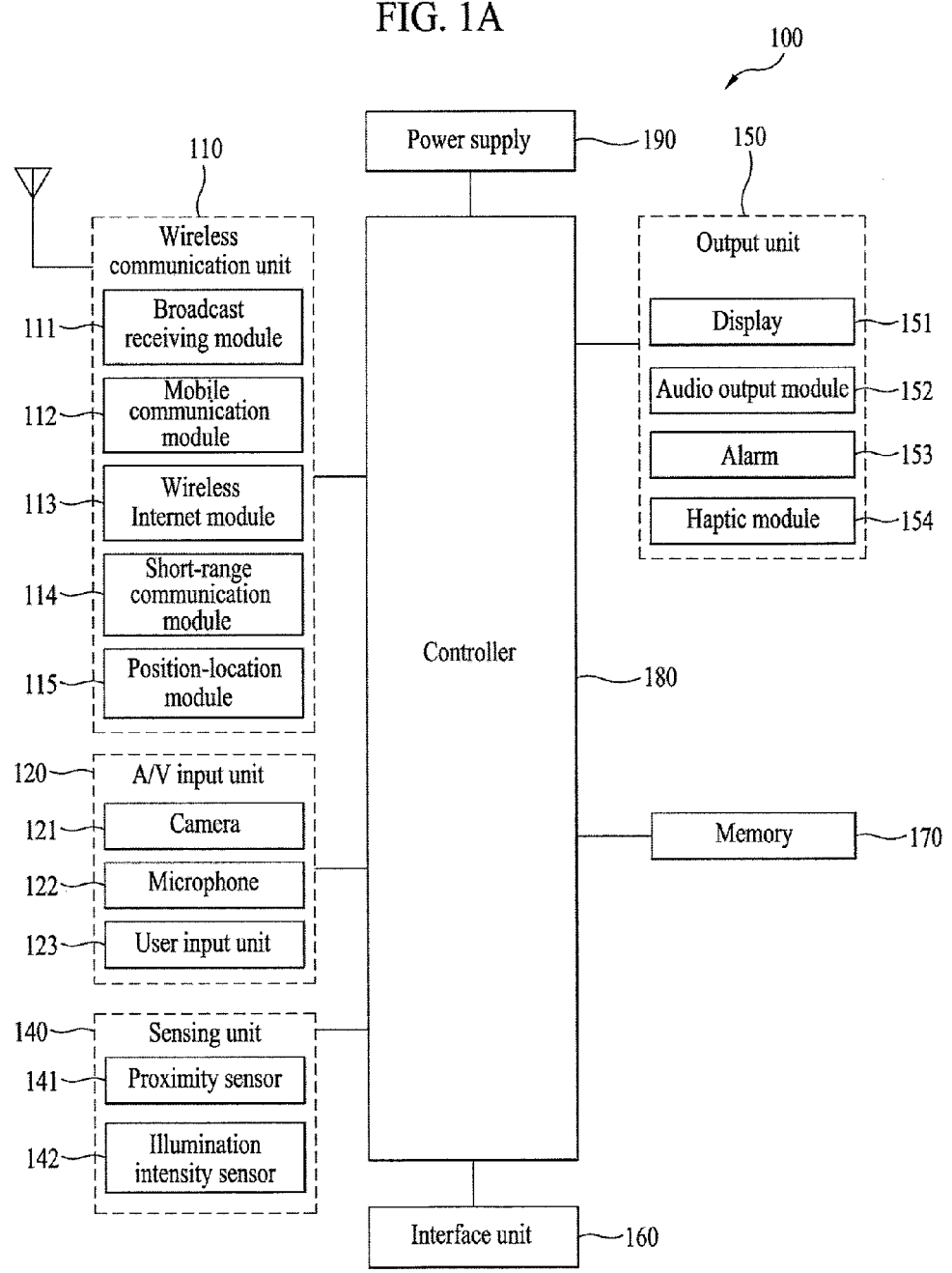
FIG. 1A is a block diagram illustrating a mobile terminal according to one embodiment of the present invention.
Figure 1B:
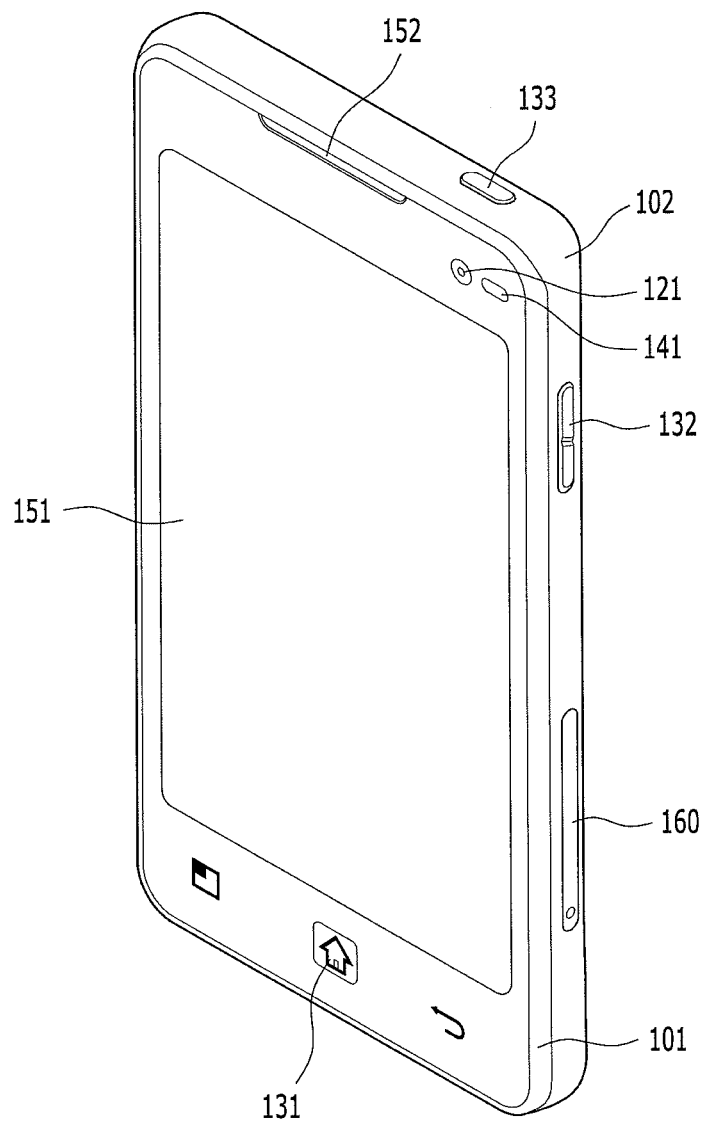
FIGS. 1B and 1C are front and rear perspective diagrams of a mobile terminal according to one embodiment of the present invention.
Figure 1C:
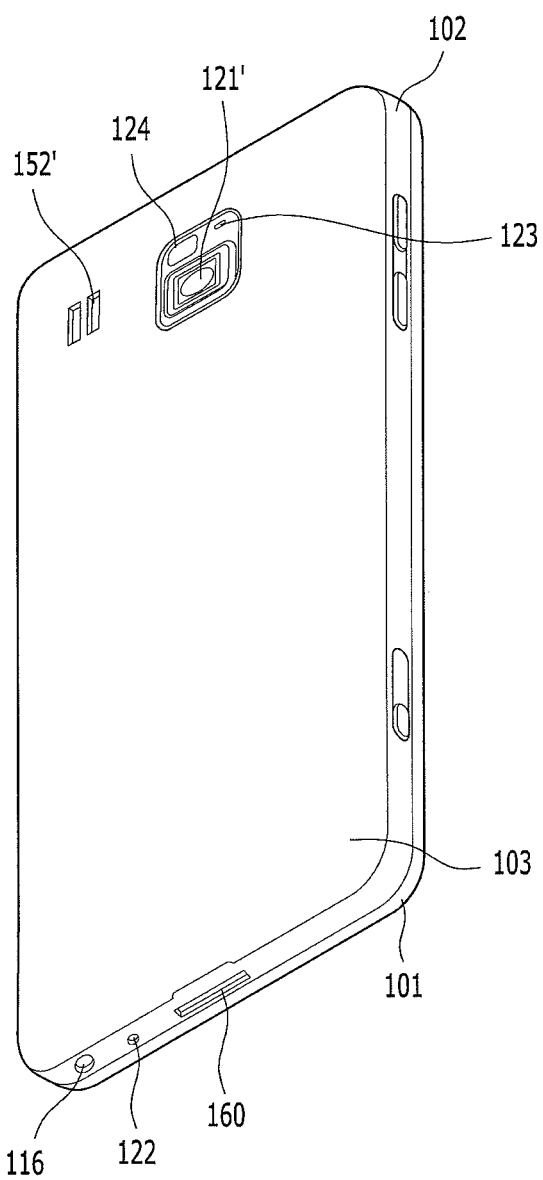

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG.

1A, the sensing unit 140 is shown having a proximity sensor 141 and an illumination sensor 142. The illumination sensor 142 can be placed in various locations on the mobile terminal for illuminating light for the camera 121, for notification purposes, etc.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display 151, an audio output module 152, an alarm 153, and a haptic module 154.

The display 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display 151, using any of a variety of touch methods. Examples of such touch methods include a resistive type, a capacitive type, an infrared type, and a magnetic field type, among others. As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information. In some embodiments, the display 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 154 can be configured to generate various tactile effects that a user feels, perceive, or otherwise experience. A typical example of a tactile effect generated by the haptic module 154 is vibration. The strength, pattern and the like of the vibration generated by the haptic module 154 can be controlled by user selection or setting by the controller. For example, the haptic module 154 may output different vibrations in a combining manner or a sequential manner.

Besides vibration, the haptic module 154 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 154 can also be implemented to allow the user to feel a tactile effect through a muscle sensation such as the user's fingers or arm, as well as transferring the tactile effect through direct contact. Two or more haptic modules 154 may be provided according to the particular configuration of the mobile terminal 100.

An alarm 153 can output a signal for indicating an event generation. Examples of events generated in the mobile terminal 100 may include message reception, call signal reception, a missed call, an alarm, a schedule notice, an email reception, information reception through an application, and the like. An alarm can include sound, light and/or vibration, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. A window of the display 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 131 may be located on another surface of the terminal body, and the second audio output module 152' may be located on the side surface of the terminal body. The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which can implement the same or different display technology. For instance, a plurality of the display units 151 may be arranged on one side, either spaced apart from each other, or these devices may be integrated, or these devices may be arranged on different surfaces.

The display 151 may also include a touch sensor which senses a touch input received at the display unit. When a touch is input to the display 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window and a display on a rear surface of the window, or a metal wire which is patterned directly on the rear surface of the window. Alternatively, the touch sensor may be integrally formed with the display. For example, the touch sensor may be disposed on a substrate of the display or within the display. The display 151 may also form a touch screen together with the touch sensor. Here, the touch screen may serve as the user input unit 123 (see FIG. 1A). Therefore, the touch screen may replace at least some of the functions of the first manipulation unit 131.

The first audio output module 152 may be implemented in the form of a speaker to output voice audio, alarm sounds, multimedia audio reproduction, and the like. The window of the display 151 will typically include an aperture to permit audio generated by the first audio output module 152 to pass. One alternative is to allow audio to be released along an assembly gap between the structural bodies (for example, a gap between the window and the front case 101). In this instance, a hole independently formed to output audio sounds may not be seen or is otherwise hidden in terms of appearance, thereby further simplifying the appearance and manufacturing of the mobile terminal 100.

The alarm 153 can be configured to output light for indicating an event generation. Examples of such events include a message reception, a call signal reception, a missed call, an alarm, a schedule notice, an email reception, information reception through an application, and the like. When a user has checked a generated event, the controller can control the alarm to stop the light output.

The first camera 121 can process image frames such as still or moving images obtained by the image sensor in a capture mode or a video call mode. The processed image frames can then be displayed on the display 151 or stored in the memory 170.

The first and second manipulation units 131 and 132 are examples of the user input unit 123, which may be manipulated by a user to provide input to the mobile terminal 100. The first and second manipulation units 131 and 132 may also be commonly referred to as a manipulating portion, and may employ any tactile method that allows the user to perform manipulation such as touch, push, scroll, or the like. The first and second manipulation units 131 and 132 may also employ any non-tactile method that allows the user to perform manipulation such as proximity touch, hovering, or the like. A third manipulation unit 133 can also be included.

FIG. 1B illustrates the first manipulation unit 131 as a touch key, but possible alternatives include a mechanical key, a push key, a touch key, and combinations thereof. Input received at the first and second manipulation units 131 and 132 may be used in various ways. For example, the first manipulation unit 131 may be used by the user to provide an input to a menu, home key, cancel, search, or the like, and the second manipulation unit 132 may be used by the user to provide an input to control a volume level being output from the first or second audio output modules 152 or 152', to switch to a touch recognition mode of the display 151, or the like.

As another example of the user input unit 131, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152 or 152', switch to a touch recognition mode of the display 151, and the like. The rear input unit may be configured to permit touch input, a push input, or combinations thereof.

The rear input unit may be located to overlap the display 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 131 in the rear input unit. As such, in situations where the first manipulation unit 131 is omitted from the front side, the display 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121' is shown located at the rear side of the terminal body and includes an image capturing direction that is substantially opposite to the image capturing direction of the first camera unit 121. If desired, second camera 121' may alternatively be located at other locations, or made to be moveable, in order to have a different image capturing direction from that which is shown.

The second camera 121' can include a plurality of lenses arranged along at least one line. The plurality of lenses may also be arranged in a matrix configuration. The cameras may be referred to as an "array camera." When the second camera 121' is implemented as an array camera, images may be captured in various manners using the plurality of lenses and images with better qualities.

As shown in FIG. 1C, a flash 124 is shown adjacent to the second camera 121'. When an image of a subject is captured with the camera 121', the flash 124 may illuminate the subject. As shown in FIG. 1C, the second audio output module 152' can be located on the terminal body. The second audio output module 152' may implement stereophonic sound functions in conjunction with the first audio output module 152, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery, which is mounted in the terminal body or detachably coupled to an outside of the terminal body. The battery may receive power via a power source cable connected to the interface unit 160. Also, the battery can be recharged in a wireless manner using a wireless charger. Wireless charging may be implemented by magnetic induction or electromagnetic resonance.

The rear cover 103 is shown coupled to the rear case 102 for shielding the battery, to prevent separation of the battery, and to protect the battery from an external impact or from foreign material. When the battery is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

According to one embodiment of the present invention, a different external terminal neighboring to a mobile terminal is identified. In addition, a display object (e.g., a notification, etc.) adaptive to the identified external is output. A controlling method for identifying an external terminal is described in detail with reference to FIG. 2 as follows.

FIG. 2 is a diagram illustrating one example of a method of transmitting a beacon signal to recognize an external terminal according to one embodiment of the present invention. Referring to FIG. 2, a terminal A 100A can monitor an external terminal (hereinafter named a neighbor external terminal) that exists around the terminal A 100A periodically or aperiodically. For the monitoring, the terminal A 100A can transmit a beacon signal 201 containing an identification information of the terminal A 100A to its surroundings.

If a terminal B 100B receives the beacon signal 201, it can transmit a beacon response signal 202 to the terminal A 100A in response to the received beacon signal 201. In this instance, the beacon response signal 202 may include an identification information of the terminal B 100B. In particular, the terminal A 100A and the terminal B 100B transceive the beacon signal 201 and the beacon response signal 202 with each other, acquire the identification information from each other, and can identify each other using the acquired identification information. Further, a mobile terminal 100 can identify a counterpart external terminal by comparing a contact information saved in the mobile terminal 100 to an acquired identification information of the counterpart external terminal.

According to one embodiment of the present invention, Bluetooth technology is available for the beacon signal 201 and the beacon response signal 202 for example. According to the Bluetooth technology, BLE (Bluetooth Low Energy) transmission scheme for transmitting data intermittently with a low power in standby mode is included. Hence, the beacon signal 201 and the beacon response signal 202 can be transmitted using the BLE transmission scheme.

In the following descriptions of embodiments of the present invention, assume that a neighbor external terminal is identified based on the exchange of the above-mentioned identification information. When a user is with a specific person, the user may want to prevent display objects (e.g., prescribed notifications, photos, etc.) from being output. For instance, when a user is with family members, the user may desire to set business related notifications not to be received. Therefore, according to one embodiment of the present invention, if a specific external terminal is detected as neighboring, the controller 180 can set a prescribed notification to be output in a block mode (i.e., a first mode). Moreover, if the specific external terminal stops neighboring, the corresponding block mode is disabled and the notification can be output in a normal mode (i.e., a second mode). Such an embodiment is described in detail with reference to the accompanying drawings as follows.

FIG. 3 is a flowchart of a method of identifying a neighbor external terminal and then changing a display mode of a display object in accordance with the identified external terminal according to one embodiment of the present invention. In addition, FIG. 4 is a diagram illustrating one example to describe a method of identifying a neighbor external terminal and then changing a display mode of a display object in accordance with the identified external terminal according to one embodiment of the present invention. The following description shall be made with reference to FIG. 3 and FIG. 4.

Referring to FIG. 3 and FIG. 4, in a step S301, the controller 180 identifies an external terminal neighboring to or existing around the mobile terminal 100 like the former embodiment described with reference to FIG. 2. If the controller 180 detects that a specific external terminal neighbors to the mobile terminal 100 in a step S302, the controller 180 goes to a step S303. Otherwise, the controller 180 goes to a step S306. In a step S303, the controller 180 outputs a prescribe display object in first mode through the touchscreen 151. In this instance, as mentioned in the foregoing description, the first mode may include a block mode. This block mode is described in detail with reference to FIG. 4 as follows.

Referring to FIG. 4 (a), the mobile terminal 100 currently outputs a lock screen through the touchscreen 151. For instance, while it is detected that a specific external terminal neighbors to the mobile terminal 100, if a notification is received, the controller 180 can output a prescribed display object (i.e., a notification indicator for the received notification) in block mode. In this instance, the block mode may include a mode for displaying a notification indicator without displaying or omitting a detailed content. Like the example shown in FIG. 4 (b), when the prescribed notification includes a notification of reception of a text message, the controller 180 can output a notification indicator 401, which notifies the reception of the text message and/or a received time information of the text message only, without outputting a detailed content of the received text message. In the following description, such a notification indicator 401 output in block mode shall be named a block indicator 401.

In a step S304, the controller 180 detects whether the specific external terminal keeps neighboring or stops neighboring. Further, the detecting method can use the same technology of the former method for the mobile terminal to identify a neighbor terminal in the step S301. If the specific external terminal is detected as keeping neighboring in the step S304, the controller 180 can return to the step S303.

If the specific external terminal is detected as stopping neighboring (i.e., leaving the surroundings of the mobile terminal 100) in the step S304, the controller 180 goes to a step S305. In the step S305, the controller 180 switches a mode of the output of the prescribed display object (i.e., the notification indicator) to a second mode from the first mode. In this instance, unlike the first mode, the second mode may include an output mode of displaying the detailed content of the notification as well as the prescribed display object.

When the specific external terminal neighbors to the mobile terminal 100, the detailed content is not displayed so that a private notification can be protected from being exposed. If the specific external terminal stops neighboring to the mobile terminal 100 or moves away from the surroundings of the mobile terminal 100, the controller 180 outputs the detailed content of the notification protected from being exposed so that a user can be informed of the detailed content as well as the notification. The second mode is described in detail with reference to FIG. 4 as follows.

First of all, while the block indicator 401 is output, like the example shown in FIG. 4 (*b*), if the specific external terminal is detected as moving away from the surroundings of the mobile terminal 100, the controller 180 can switch the output to a notification indicator 402 in second mode. In this instance, the notification indicator 402 in the second mode indicates a presence of a text message and outputs a detailed content of the received text message (FIG. 4 (*c*)). In the following description, the notification indicator 402 output in the second mode shall be named a normal indicator 402.

If a specific external terminal is not detected from the surroundings of the mobile terminal 100 at all in the step S302, the controller 180 can directly output the prescribed display object (e.g., the notification indicator) in the second mode. In particular, since it is unnecessary to protect a prescribed notification from being exposed, the prescribed display object is output in the second mode in order to directly output a detailed content of the notification as well.

In summary, the above-described embodiment proposes to control a notification to be output in different mode in accordance with an identification result of a neighbor external terminal. In the following description, when an external terminal is identified, a method of differentiating a display mode is described in detail with reference to the accompanying drawing.

In the description of a following embodiment, a notification indicator is taken as one example of a display object, by which the present invention is non-limited. FIG. 5 is a diagram illustrating one example to describe a method of notifying that a specific neighbor external terminal is identified according to one embodiment of the present invention.

Referring to FIG. 5 (*a*), an active screen of a notification window (or a notification drawer) 500 is displayed. In this instance, the notification window 500 may mean an output region for gathering to collectively provide a user with various kinds of notifications possibly occurring in the mobile terminal 100. FIG. 5 (*a*) shows a status that a neighbor external terminal is not identified.

FIG. 5 (*b*) shows a status that a first external terminal is identified. As an external terminal is identified, the controller 180 can output a first character (hereinafter named a character) 501-1 to indicate that the corresponding external terminal has been identified. Moreover, if a second external terminal is identified, like the example shown in FIG. 5 (*c*), the controller 180 can output a second character 501-2 together with the first character 501-1. In the description of the following embodiment, if a specific character 501 is displayed on the touchscreen 15, it can be regarded as a specific external terminal corresponding to the specific character 501 is identified.

One example of a notification displayed in different mode on a notification window 500 is described with reference to FIG. 6A as follows. FIG. 6A is a diagram illustrating one example of a notification displayed in different mode on a notification window 500. Referring to FIG. 6A (*a*), as a neighbor first external terminal is identified, the controller 180 can output a first character 501-1 and can also output a first normal indicator 402-1 and a second normal indicator 402-2 for previously generated notifications. When an additional notification is received, referring to FIG. 6A (*b*), the controller 180 can output a first block indicator 401-1 for the additional notification.

Looking into the example of the first block indicator 401-1 shown in FIG. 6A (*b*), an icon of a notification generated application is displayed only but a detailed content of the notification is not displayed. While the first block indicator 401-1 is output, if the controller 180 detects that the first external terminal moves away from the surroundings (i.e., stops neighboring), the controller 180 can control the additional notification to be output by being switched to a third normal indicator 402-3. Further, the third normal indicator 402-3 can display a detailed content of the corresponding notification as well. In particular, if the additional notification includes a notification of a text message, the third normal indicator 402-3 can include a text sender counterpart, details of the text message, and an output of a received time of the text message.

Meanwhile, the above-described embodiment relates to an output of an indicator for a reception of a prescribed notification. Yet, according to another embodiment of the present invention, an output of a block mode can be supported. Such an embodiment is described in detail with reference to FIG. 6B as follows.

FIG. 6B is a diagram illustrating one example of a method of blocking a displayed content depending on a recognized neighbor external terminal according to one embodiment of the present invention. Referring to FIG. 6B (*a*), the mobile terminal 100 currently displays a thumbnail list 603 in a gallery application through the touchscreen 151. In this instance, the thumbnail list 603 includes first to sixth thumbnail items 602-1 to 602-6. In particular, assume that the fourth to sixth thumbnail items 602-4 to 602-6 are blocked against a specific external terminal.

FIG. 6B (*b*) shows a state that a first external terminal is detected as existing nearby. If the first external terminal is detected from its surroundings, the mobile terminal 100 can perform a block processing on the fourth to sixth items 602-4 to 602-6 to be blocked. In this instance, the block processing can control the fourth to sixth items 602-4 to 602-6 not to be displayed on the thumbnail list 603 anymore (i.e., to be displayed as not existing in the thumbnail list 603). In addition, the block processing can display a thumbnail item to be displayed in a manner that a prescribed image filtering (e.g.., a mosaic effect, a blurred effect, an effect of outlining an image, etc.) is applied to the thumbnail item.

Moreover, the controller 180 can control a first character 501-1, which indicates the first external terminal, to be displayed on each of the block-processed thumbnail items in the thumbnail list 603. Hence, a user can confirm that the corresponding thumbnail item is block-processed due to an approach of a prescribed external terminal based on the first character 501-1.

FIG. 7 is a diagram illustrating one example of a method of displaying a character on a block indicator according to one embodiment of the present invention. Referring to FIG. 7, when a block indicator is displayed, it is necessary for a user to check a fact that the block is set due to a recognition of a prescribed external terminal Hence, according to one embodiment of the present invention, a character 501 is displayed on a block indicator, whereby a user can be informed that a block is set due to a prescribed external terminal.

FIG. 7 (a) shows an active screen of a notification window 500. In addition, a first character 501-1 and a second character 501-2 are output to the notification window 500. The mobile terminal 100 currently outputs a first block indicator 401-1 as a second external terminal corresponding to the second character 501-2 is identified nearby the mobile terminal 100.

In order to indicate that the first block indicator 401-1 is set due to a detection of the second external terminal, the controller 180 can control the second character 501-2 to be further displayed on the first block indicator 401-1. Moreover, according to an embodiment of the present invention, if a block setting command applied to the first block indicator 401-1 is received, a block setting change popup window 701 can be output. In this instance, the block setting command may include an input 10a of selecting the second character 501-2.

The block setting change popup window 701 includes a check box 701-1 for the first character 501-1 and a check box 701-2 for the second character 501-2. In addition, the corresponding settings can be changed by checking or unchecking each of the check boxes 701-1 and 701-2. For instance, after both of the check boxes 701-1 and 701-2 have been checked, if a confirm button is selected, the block settings of the first and second external terminals can be performed on the first block indicator 401-1.

A third character 501-3 in form of a group including both of the first and second characters 501-1 and 501-2 can be output onto the first block indicator 401-1 based on identifications of the first and second external terminals. The above-described embodiment proposes that a block indicator for a prescribed notification is displayed in order to display the prescribed notification to enable a block. Meanwhile, it may be able to control a prescribed notification not to be displayed at all instead of displaying a block indicator. Such an embodiment is described in detail with reference to FIG. 8 as follows.

FIG. 8 is a diagram illustrating one example of a method of skipping an output of a notification when detecting a neighbor external terminal according to one embodiment of the present invention. Referring to FIG. 8 (a), the controller 180 currently outputs a notification window 500 through the touchscreen 151. In addition, the controller 180 currently outputs a fourth character 501-4 of a group type to indicate that an external terminal is identified.

According to one embodiment of the present invention, when a character of a group type is output, it is proposed to display the number 801 of external terminals indicated by the character of the group type. In particular, like the example shown in FIG. 8 (a), since the number '2' is displayed on the fourth character 501-4 of the group type, it can determine that 2 external terminals are identified.

As external terminals are identified, some of at least one or more generated notifications can be represented as normal indicators 402-1 and 402-2, while the rest of the at least one or more generated notifications are block-processed. According to the embodiment described with reference to FIG. 8, it is proposed that the block-processed notifications are not displayed (i.e., to hide the corresponding notifications) (cf. FIG. 8 (a)).

Yet, in order to indicate a presence of the block-processed notifications, it can output a guide text 800 indicating that the hidden notifications further exist as well as the displayed notifications. If an input 10p of selecting the guide text 800 is received, the controller 180 can output third and fourth normal indicators 402-3 and 402-4 for the hidden notifications.

Referring to FIG. 8 (b), the first and second characters 501-1 and 501-2 for identifying the blocked external terminals can be displayed on the output third and fourth normal indicators 402-3 and 402-4, respectively. According to one embodiment of the present invention, cancel icons 801-1 and 801-2 are further displayed on the first and second characters 501-1 and 501-2, respectively. If the cancel icon is selected, it can cancel the corresponding block setting.

Thus, according to the above-described embodiment, it can easily change the block setting using the cancel icon. Meanwhile, according to another embodiment of the present invention, a method of facilitating a block setting using a touch gesture is proposed. Such a setting method is described with reference to FIG. 9 and FIG. 10 as follows.

FIG. 9 and FIG. 10 are diagrams illustrating examples of a method of facilitating a block setting based on a touch gesture input to a notification indicator according to one embodiment of the present invention. Referring to FIG. 9 (a), as a first external terminal is identified from surroundings, the controller 180 can output a first character 501-1. In addition, the controller 180 can output a first normal indicator 402-1 and a second normal indicator 402-2 for previously generated notifications.

If a prescribed touch gesture is applied to the second normal indicator 402-2, the controller 180 can output a guide text 901 for querying whether to change a block setting for the second normal indicator 402-2 and a confirm button. In this instance, the touch gesture can include an input performed by applying a touch 10b to the second normal indicator 402-2 and then performing a drag 10c in a prescribed direction by maintaining the touch 10b.

After the output confirm button has been selected, if a notification corresponding to the second normal indicator 402-2 is received in the future, a block setting for the first external terminal can be changed. In particular, while the first external terminal is identified from surroundings, if a corresponding notification is received, the controller 180 can output a block indicator 401 corresponding to the notification or the corresponding notification in a hidden form.

If the confirm button is not selected for a prescribed duration, the controller 180 deletes the second normal indicator 402-2 from the notification window 500 and does not display it anymore. According to the embodiment described with reference to FIG. 9, a touch gesture for changing a block setting for a prescribed notification output as a normal indicator 402 is explained. In the following description, a touch gesture for performing a block setting on a prescribed notification output as a block indicator 402 or a prescribed notification output in a hidden form is explained with reference to FIG. 10.

Referring to FIG. 10 (a), as a first external terminal is identified from surroundings, the controller 180 can output a first character 501-1. In addition, the controller 180 can output a first normal indicator 402-1 and a second normal indicator 402-2 for previously generated notifications. Moreover, in accordance with a block setting, like the example shown in FIG. 10 (b), the controller 180 can output a third indicator 402-3 and a fourth normal indicator 402-4 for the hidden notifications.

If a prescribed touch gesture is applied to the third normal indicator 402-3, the controller 180 can output a guide text 1001 for querying whether to change a block setting for the third normal indicator 402-3 and a confirm button. In this instance, the touch gesture can include an input performed by applying a touch 10d to the third normal indicator 402-3 and then performing a drag 10e in a prescribed direction by maintaining the touch 10d.

After the output confirm button has been selected, if a notification corresponding to the third normal indicator 402-3 is received in the future, it can change a block setting for the first external terminal. In particular, while the first external terminal is identified from surroundings, if a corresponding notification is received, the controller 180 can output the notification in form of a normal indicator 402 without further block processing. If the confirm button is not selected for a prescribed duration, the controller 180 deletes the third normal indicator 402-3 from the notification window 500 and does not display it anymore.

FIG. 11 is a diagram illustrating one example of a method of recommending a search keyword based on a recognized neighbor external terminal according to one embodiment of the present invention. Referring to FIG. 11 (a), as an external terminal is identified from surroundings, the controller 180 can output a fifth character 501-5 represented in a group form. In addition, the controller 180 can output first to third normal indicators 402-1 to 402-3 for previously generated notifications.

Moreover, the notification window 500 can further output a search window 1101 for inputting a search keyword for a notification search. In response to an input keyword, the controller 180 searches for a notification containing the corresponding keyword and can then output a search result to the notification window 500.

Meanwhile, according to one embodiment of the present invention, it is proposed to display a keyword list 1102 by recommending a search keyword based on the recognized external terminal. For instance, if an external terminal for a family member is recognized, it may be preferable that such a keyword as 'picnic', 'drive course' and the like is recommended as a search keyword. For another instance, if an external terminal for a company member is recognized, it is may be preferable that such a keyword as 'meeting place', 'workshop' and the like is recommended as a search keyword.

Figure 12A:
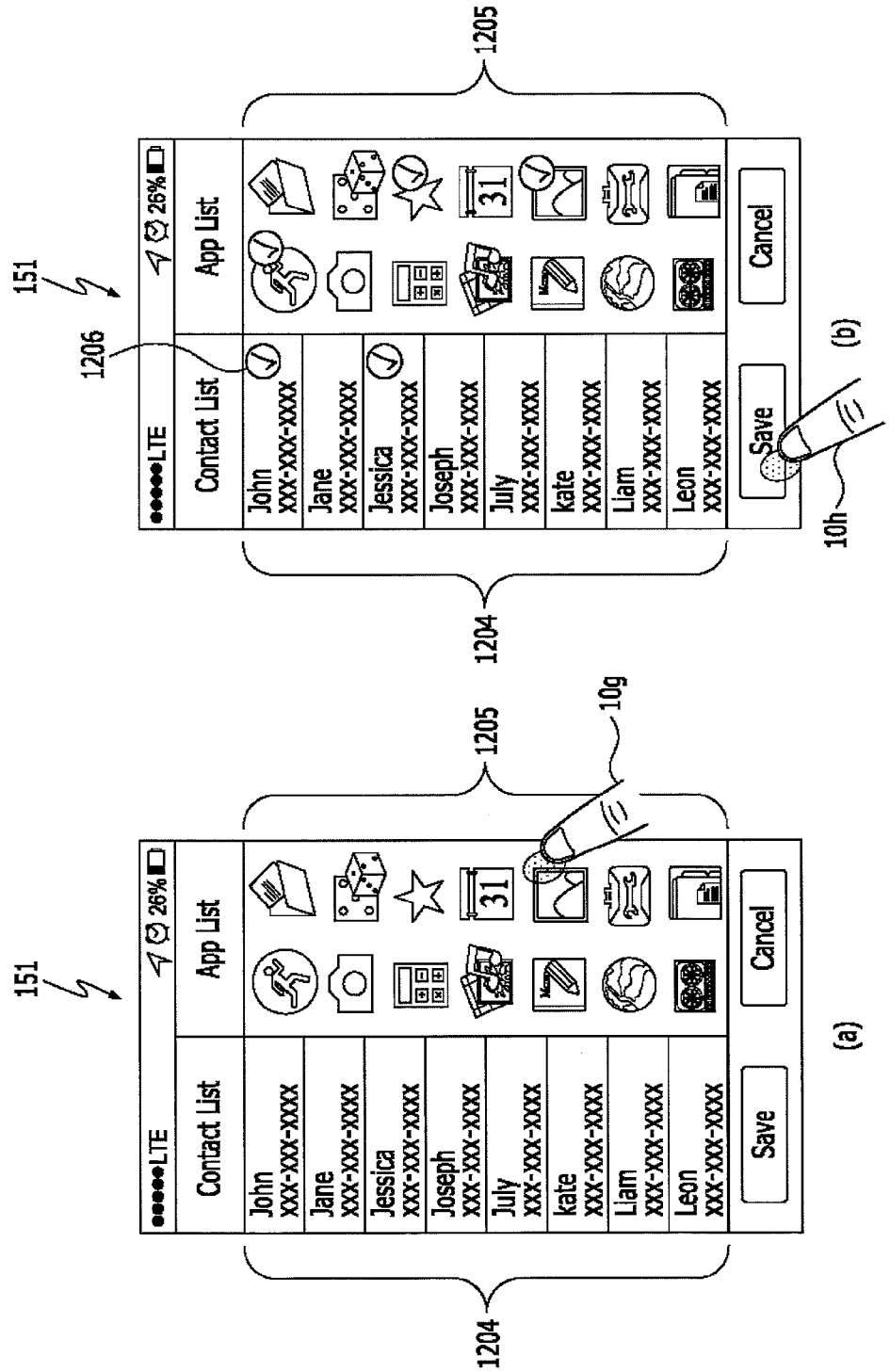
FIG. 12A and FIG. 12B are diagrams illustrating examples of a controlling method for applying a block setting to each application according to one embodiment of the present invention.
Figure 12B:
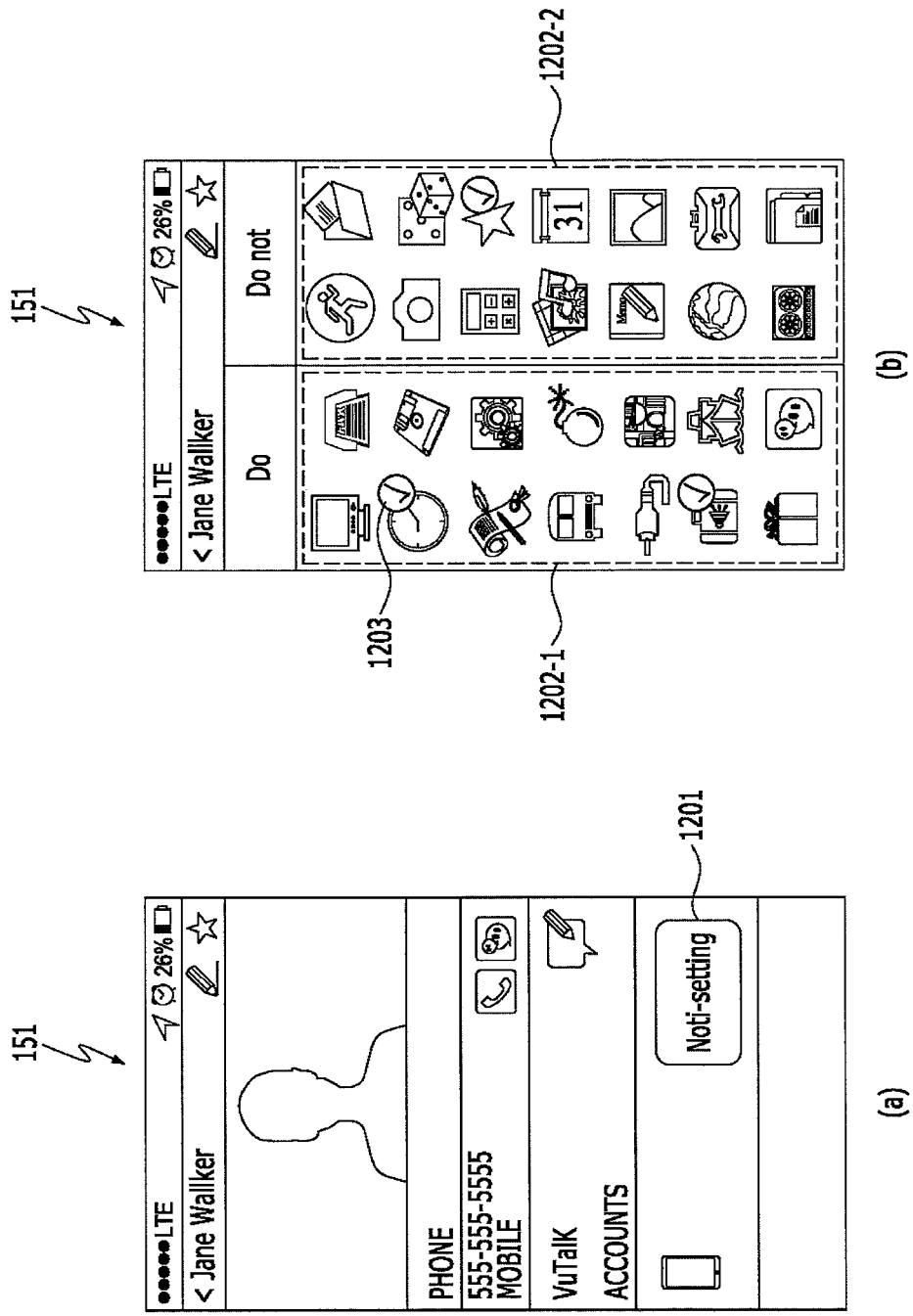

In particular, like the example shown in FIG. 11 (b), the controller 180 selects a keyword based on the recognized first external terminal and can then display a keyword list 1102 for the selected keyword and a virtual keypad 1103 for receiving an input of a keyword on the touchscreen 151. According to the above embodiment, a display mode for a blocked notification is described. In the following description, a method for applying a block setting to each notification individually is explained in detail. FIG. 12A and FIG. 12B are diagrams illustrating examples of a method for applying a block setting to each application according to one embodiment of the present invention.

Referring to FIG. 12A, the controller 180 outputs a contact list 1204 and an application list through the touchscreen 151. The controller 180 can apply a block setting based on a contact selected from the contact list 1204 and an application selected from the application list 1205. For instance, if the controller 180 detects an external terminal, which corresponds to the content selected from the contact list 1204, from surroundings, the controller 180 can perform a block processing on a notification generated from the selected application (e.g., outputs a block indicator or the notification in a hidden form).

According to one embodiment of the present invention, a plurality of items can be selected from the contact list 1204 and the application list 1205. In addition, a check mark 1206 1206 can be displayed on each of the selected items to indicate that the corresponding item is selected. In particular, after at least one contact and at least one application have been selected, if a confirm button is selected by a prescribed action 10h, the controller 180 can apply a block setting to the selected at least one application for the selected at least one contact.

Referring to FIG. 12B (a), a detailed contact information screen for a prescribed counterpart (e.g., Jane Walker in the drawing) is currently displayed on a contact application. According to one embodiment of the present invention, the detailed contact information screen can include a button (hereinafter named a noti-setting button) 1201 for setting a notification.

If the noti-setting button 1201 is selected, like the example shown in FIG. 12B (b), the controller 180 can output an application list. According to one embodiment of the present invention, the application list can include an application list (i.e., a notification setting list) 1202-1 for cancelling a block and an application list (i.e., a notification block list) for setting a block.

When a prescribed counterpart 'Jane Walker' is nearby, a notification generated from at least one application selected from the notification setting list 1202-1 can be output by the controller 180 (e.g., through a normal indicator). Likewise, when a prescribed counterpart 'Jane Walker' is nearby, a notification generated from at least one application selected from the notification block list 1202-2 can be blocked by the controller 180 (e.g., output in form of a block indicator or in a hidden form). Meanwhile, according to one embodiment of the present invention, if an external terminal detected from surroundings currently exists, it is proposed to recommend a block setting. Such a recommended setting function is described in detail with reference to FIG. 13 as follows.

Figure 13:
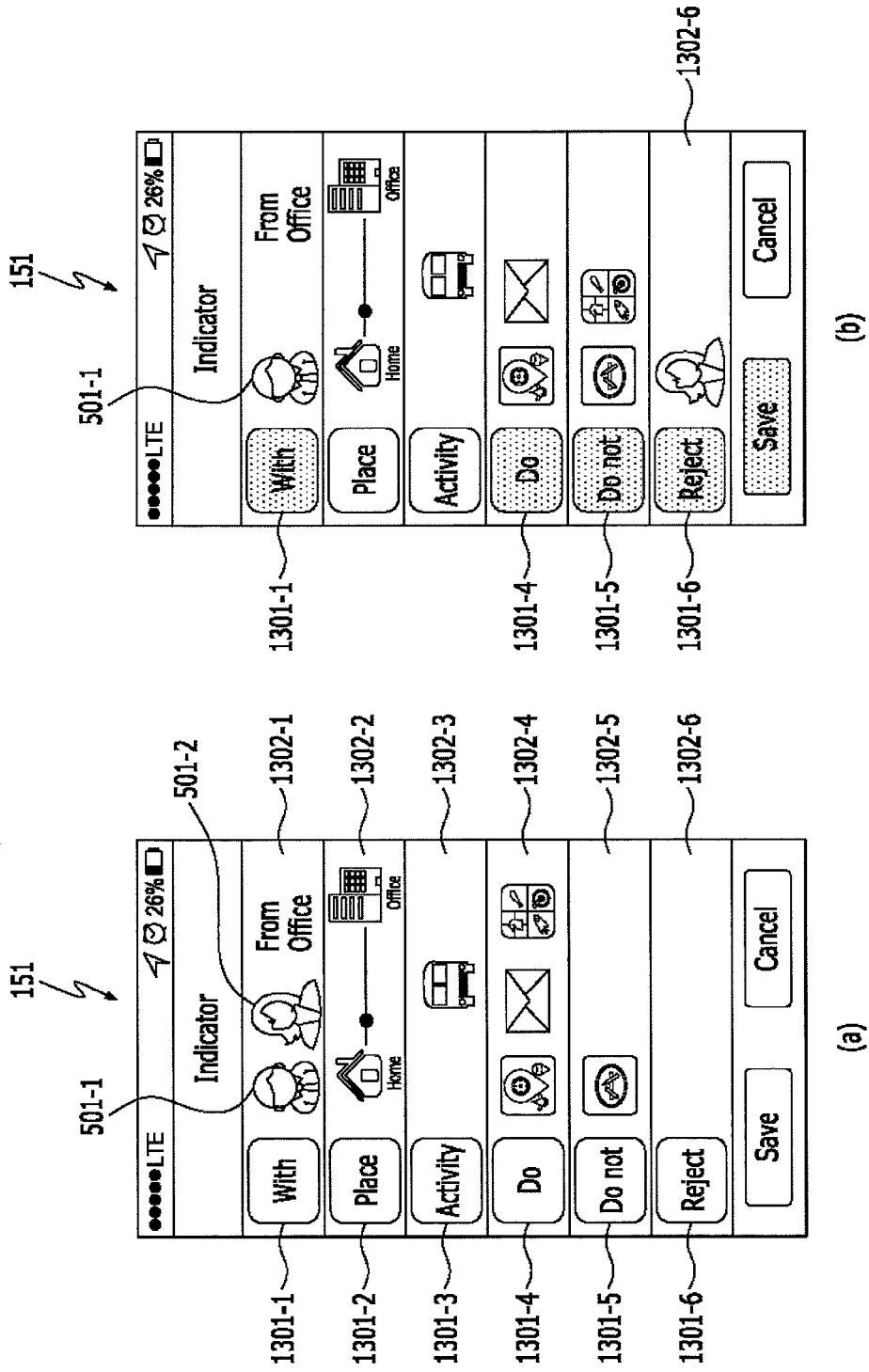
FIG. 13 is a diagram illustrating one example of a controlling method for recommending a block setting according to one embodiment of the present invention.

FIG. 13 is a diagram illustrating one example of a method for recommending a block setting according to one embodiment of the present invention. Referring to FIG. 13, according to one embodiment of the present invention, if a block setting command is received, the controller can output a block setting screen including at least one recommended setting (FIG. 13 (a)).

The block setting screen shown in FIG. 13 (a) includes a plurality of setting items 1302-1 to 1302-6. At least one of a plurality of the setting items 1302-1 to 1302-6 can include a setting item recommended by the controller 180. For instance, the first setting item is the item for designating an external terminal to which a block setting will be applied. The controller 180 recommends external terminals currently detected from surroundings and can then display characters 501-1 and 501-2 corresponding to the recommended external terminals.

The second setting item 1302-2 is the item for designating a geo-location for a block setting. In particular, the second setting item 1302-2 is the item to designate whether to block a notification nearby a home or a company for example. The controller 180 determines a current geo-location. If the determined geo-location is home, the controller 180 can recommend a setting of applying a block nearby home.

The third setting item 1302-3 is the item for determining whether to apply a block setting depending on a transportation means. For instance, the third setting item 1302-3 is the item for applying a block to a notification if the mobile terminal 100 is in a car. The fourth setting item 1302-4 is the item for designating an application that allows a reception of a notification if the condition designated in the first to third setting items 1302-1 to 1302-3. Based on at least one external terminal that is currently detected, the controller 180 can recommend and display the application that allows the at least one notification.

If the condition designated in the first to third setting items 1302-1 to 1302-3 is met, the fifth setting item 1302-5 is the item for designating an application to block a reception of a notification. Based on at least one external terminal that is currently detected, the controller 180 can recommend and display the application for blocking the at least one notification.

The sixth setting item 1302-6 is the item for designating a blocked counterpart for blocking a notification received from a prescribed counterpart. If the designated condition is met, the controller 180 can block a notification received from the blocked counterpart. For instance, if a user is with a specific girlfriend, it may be appropriate for the user to block a message received from another girlfriend. Hence, after an external terminal of a specific girlfriend is designated in the first setting item 1302-1, if another girlfriend is designated as a blocked counterpart in the sixth setting item 1302-6, a notification of a phone call or message received from another girlfriend can be displayed by being blocked while a user is with the specific girlfriend.

If the sixth setting item 1302-6 is selected, the controller 180 outputs at least one pre-saved contact list and can then designate a counterpart selected from the output contact list as a blocked counterpart. The conditions of the first to sixth setting items 1302-1 to 1302-6 can be applied simultaneously (i.e., AND condition) or individually (i.e., OR condition).

Meanwhile, according to one embodiment of the present invention, in order for a user-desired item to be set only among the items recommended on the block setting screen, item activate buttons 1301-1 to 1301-6 can be output by being included in the corresponding items, respectively.

After each of the item activate buttons 1301-1 to 1301-6 has been activated, if a save command is received, the controller 180 can complete the block setting using the condition of each of the activated items only. Referring to FIG. 13 (*b*), the controller 180 can control the activate buttons 1301-1, 1301-4, 1301-5 and 1301-6 of the activated items to be displayed identifiably and can apply a blind setting for each of the activated items.

Meanwhile, according to the above embodiments described with reference to FIGS. 12A to 13, since a task of selecting each contact/application should be performed, it is difficult to apply the corresponding embodiments to a case of numerous contacts/applications. Therefore, a method applicable to f a plurality of contacts/applications according to one embodiment of the present invention is proposed as follows.

Figure 14:
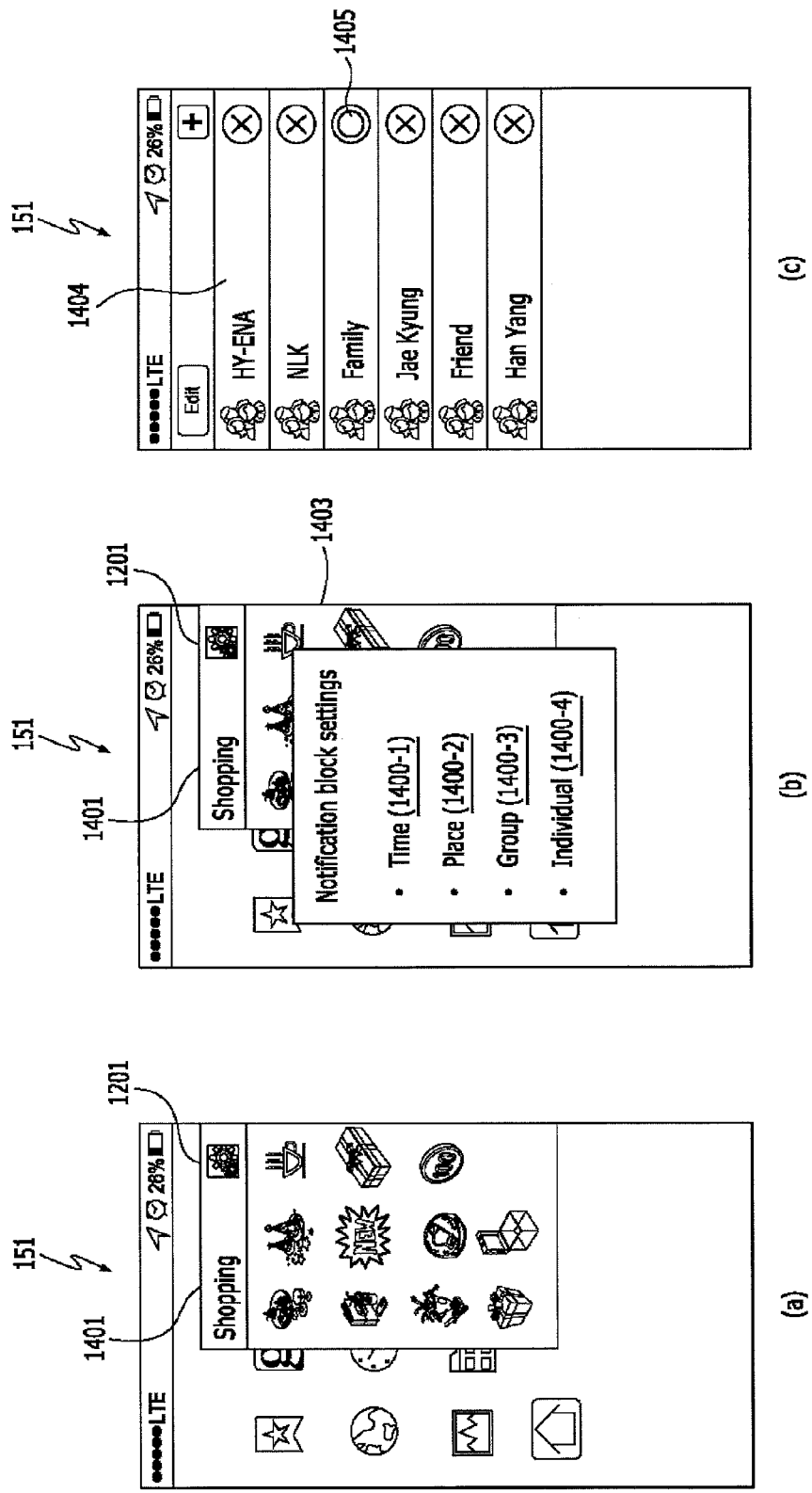
FIG. 14 is a diagram illustrating one example of a method of controlling a block setting by folder unit according to one embodiment of the present invention.

FIG. 14 is a diagram illustrating one example of a method of controlling a block setting by folder unit according to one embodiment of the present invention. Referring to FIG. 14 (*a*), a home screen is currently displayed. In addition, assume that application icons are included in a prescribed folder 1401 displayed on the home screen. If a block setting command for the folder is received, referring to FIG. 14 (*b*), the controller 180 can output a popup window 1403 including a setting list for the block setting. A first setting item 1400-1 in the included setting list is the item for setting a block time. In addition, the controller 180 can block a notification within a set time interval.

A second setting item 1400-2 in the included setting list is the item for setting a block place. In addition, the controller 180 can block a notification in a set place. A third setting item 1400-3 in the included setting list is the item for setting a block contact group. In addition, the controller 180 can block a notification received from a counterpart terminal belonging to a set contact group. In particular, according to the present item, a blocked counterpart can be designated by group units instead of being designated individually, the present item can be usefully available for a case of designating many counterparts.

If the third setting item 1400-3 is selected, the controller 180 outputs a group list 1404 for selecting a contact group and can then set a block on at least one contact group selected from the group list 1404 (FIG. 14 (*c*)). Like the example shown in FIG. 14 (*c*), the selected contact group can be displayed by being identifiable from other groups (1405). A fourth setting item 1400-4 in the included setting list is the item for setting a blocked counterpart terminal. The controller 180 can block a notification received from the set counterpart terminal.

Figure 15:
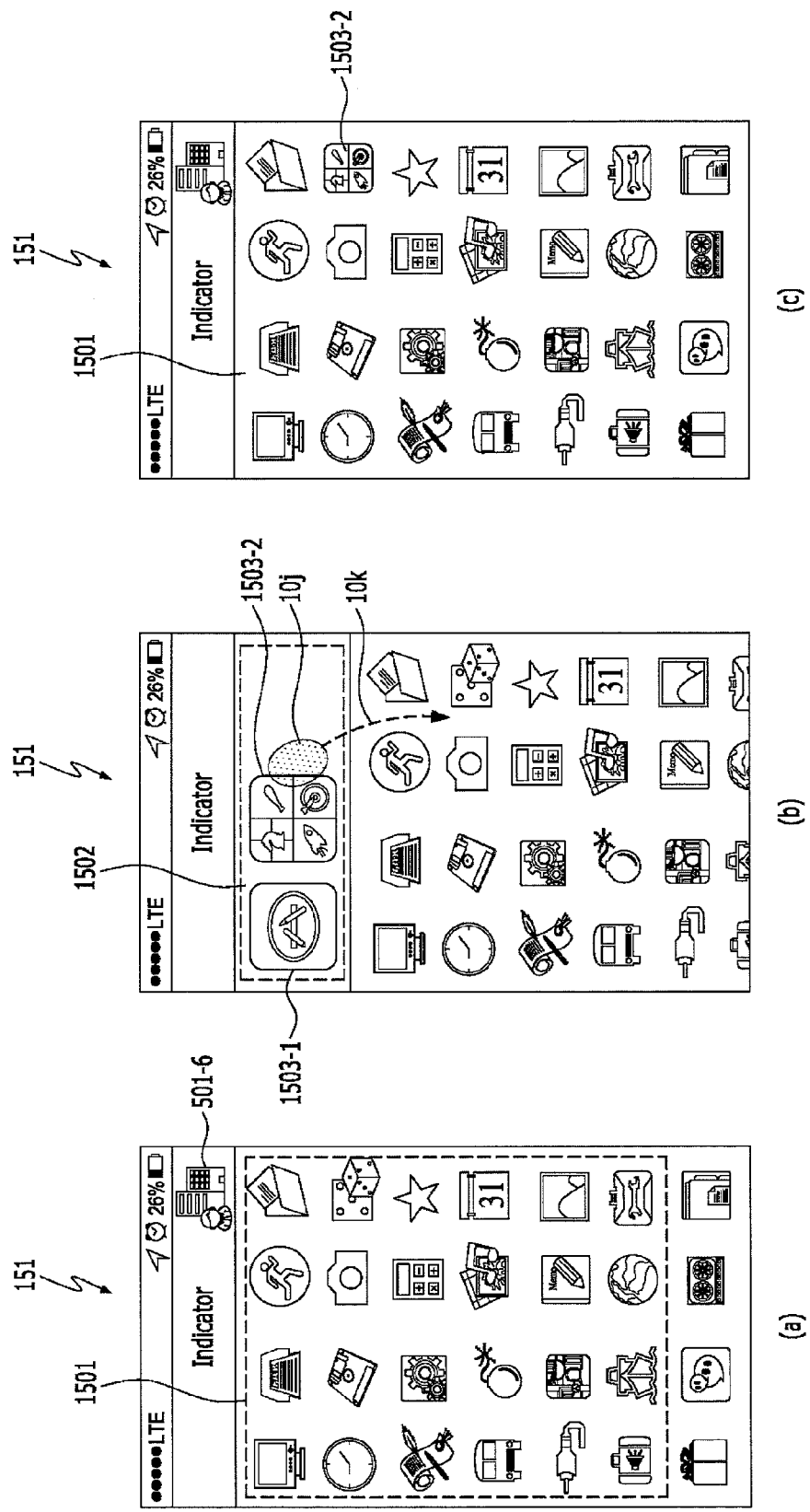
FIG. 15 is a diagram illustrating one example of a controlling method of blocking a display of an application activate icon and then reconfirming the blocked application activate icon according to one embodiment of the present invention.

Meanwhile, the above-described block operation may be applicable to an application activate icon as well as to an output of a notification. The reason for this is that an application activate icon can have aspect of private life. Such an embodiment is described in detail with reference to FIG. 15 as follows. FIG. 15 is a diagram illustrating one example of a method of blocking a display of an application activate icon and then reconfirming the blocked application activate icon according to one embodiment of the present invention. Referring to FIG. 15 (*a*), the controller 180 can output a sixth character 501-6 of a group type corresponding to at least one identified external terminal. The controller 180 outputs an icon list 1501 and can hide a display of at least one application activate icon, which is blocked to be displayed to correspond to the sixth character 501-6, from the icon list 1501.

If a command for checking a hidden icon is received, the controller 180 can output the at least one or more application activate icons 1503-1 and 1503-2 to a prescribed region 1502 of the touchscreen 151. For examples, the command for checking the hidden icons may include an input of touching the sixth character 501-6. If a command for cancelling a hiding of one 1503-2 of the hidden at least one or more application activate icons 1503-1 and 1503-2 is received, the controller 180 can display the cancelled icon 1503-2 on the icon list 1501 (FIG. 15 (*c*)). In this instance, the input of cancelling the hiding may include a touch gesture performed by applying a touch 10*j* to the corresponding icon 1503-2 to cancel and then performing a drag 10*k* by maintaining the touch 10*j*.

Figure 16:
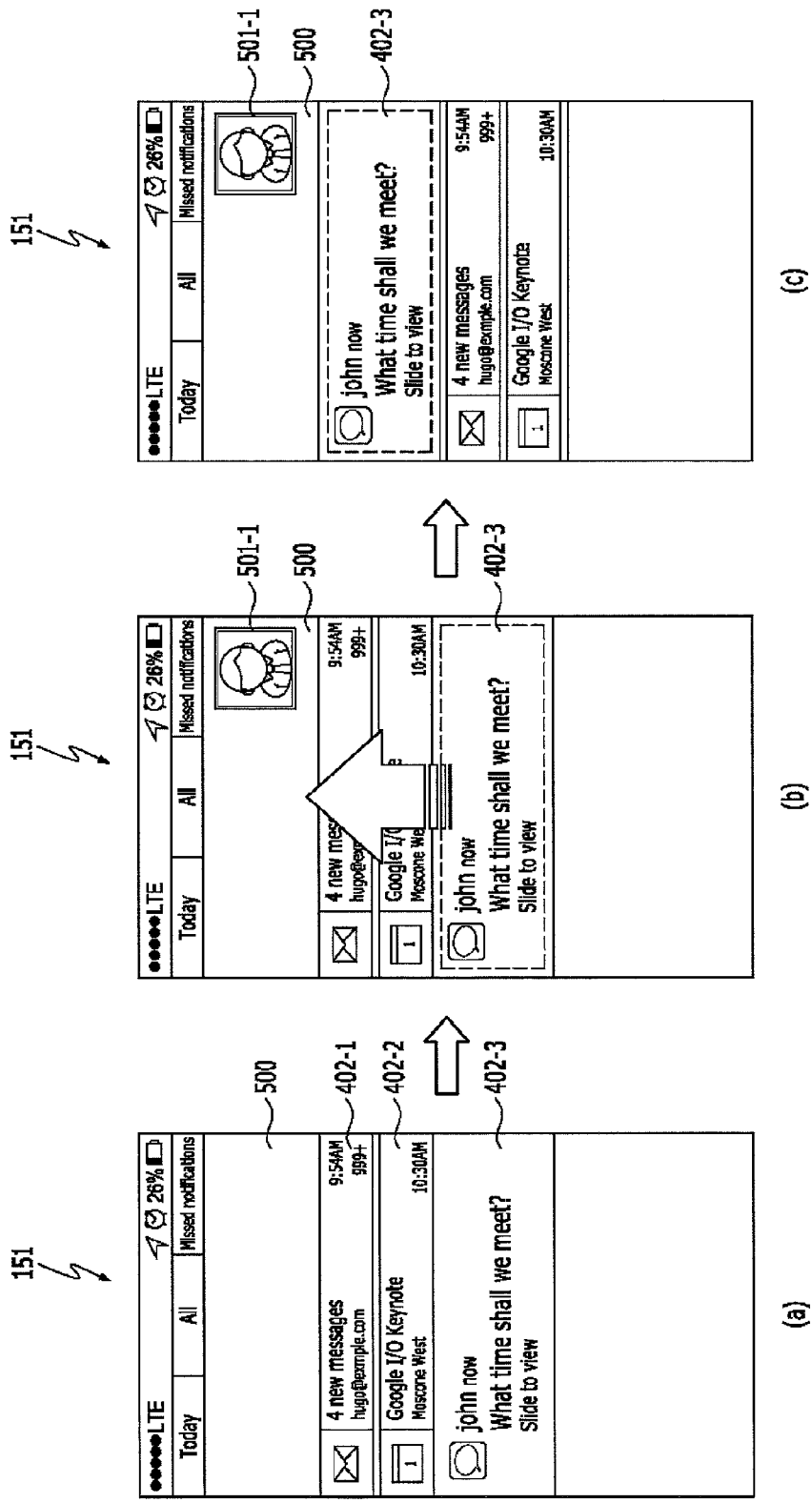
FIG. 16 is a diagram illustrating one example of a method of controlling a display order of a notification on a notification list based on a recognized neighbor external terminal according to one embodiment of the present invention.

Meanwhile, according to one embodiment of the present invention, based on an external terminal recognized from surroundings, a method of controlling a display order on a plurality of notification lists is proposed. Such an embodiment is described in detail with reference to FIG. 16 as follows. FIG. 16 is a diagram illustrating one example of a method of controlling a display order of a notification on a notification list based on a recognized neighbor external terminal according to one embodiment of the present invention. Referring to FIG. 16 (*a*), the controller 180 can output first to third normal indicators 402-1 to 402-3 for previously generated notifications. In particular, the displayed normal indicators are displayed on a manner of being sorted into a list by order of a notification generated time (or by a specific sorting reference).

According to one embodiment of the present invention, it is proposed that a prescribed indicator is displayed by being emphasized or preferentially in accordance with a result of identification of an external terminal. For instance, if a text message received from a specific counterpart is relegated to a lower priority with lapse of a considerable time, when the specific counterpart is encountered, the corresponding text message can be emphasized or displayed in high order on an indicator list.

In the example shown in FIG. 16 (b), assume that there exists the third normal indicator 402-3 received from a first external terminal. As the first external terminal is recognized, the controller 180 displays a first character 501-1 and controls the third normal indicator 402-3 to be displayed by being shifted to a top side on the indicator list (FIG. 16 (c)).

Alternatively, the controller 180 displays the first character 501-1 and controls the third normal indicator 402-3 to be displayed by being emphasized on the indicator list (i.e., displaying an outline of the third normal indicator, flickering the third normal indicator, etc.). According to the above embodiment described with reference to FIG. 16, when recognizing an unrecognized prescribed external terminal is taken as one example. On the contrary, if a currently recognized prescribed external terminal becomes unrecognized (i.e., if the prescribed external terminal currently existing nearby moves away from surroundings), a corresponding indicator can be displayed by being emphasized or shifted upward.

According to one embodiment of the present invention, it is proposed to record a to-do list of jobs to do on encountering a prescribed counterpart. If a prescribed counterpart terminal is detected from surroundings, it is proposed to inform the prescribed counterpart terminal of the to-do list. Generally, if there is a job to do on encountering somebody, the job may be forgotten despite taking a memo of the job to do. Hence, according to one embodiment of the present invention, when a prescribed counterpart terminal is encountered, it is proposed to display a notification instantly. Such an embodiment is described in detail with reference to FIGS. 17 to 19 as follows.

Figure 17:
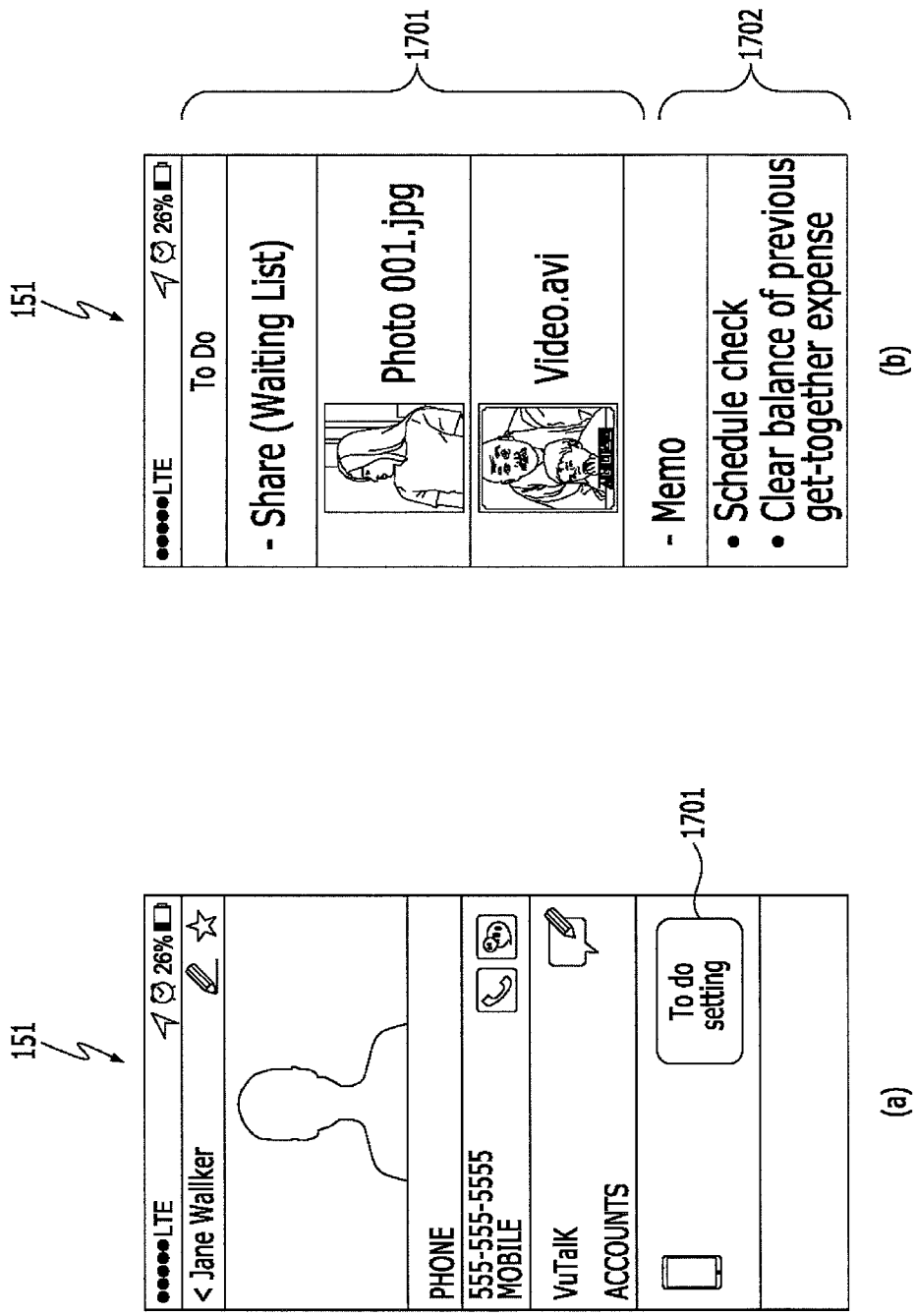
FIG. 17 is a diagram illustrating one example of a controlling method of setting a to-do list for a prescribed counterpart terminal according to one embodiment of the present invention.

FIG. 17 is a diagram illustrating one example of a method of setting a to-do list for a prescribed counterpart terminal according to one embodiment of the present invention. Referring to FIG. 17 (a), a detailed contact information screen for a prescribed counterpart (e.g., Jane Walker) is displayed on a contact application. According to one embodiment of the present invention, the detailed contact information screen can include a to-do setting button 1201. In particular, the to-do setting button 1201 is the button for the to-do setting for the prescribed counterpart (or counterpart terminal) 'Jane Walker'.

If the to-do setting button 1201 is selected, referring to FIG. 17 (b), the controller 180 can output a to-do list. In this instance, the to-do list can include a file list 1701 to be sent to a prescribed counterpart and a memo list 1702. After an add command has been applied to the file list 1701 to be sent, if a file/photo/video or the like is selected to be added, the selected one can be added to the file list 1701 to be sent. Moreover, like a following example described with reference to FIG. 18, as soon as a photo is taken, the controller 180 can automatically add the taken photo to the file list 1701 to be sent. If an add command is applied to the memo list 1702, text data input by a user can be added to the memo list 1702.

Figure 18:
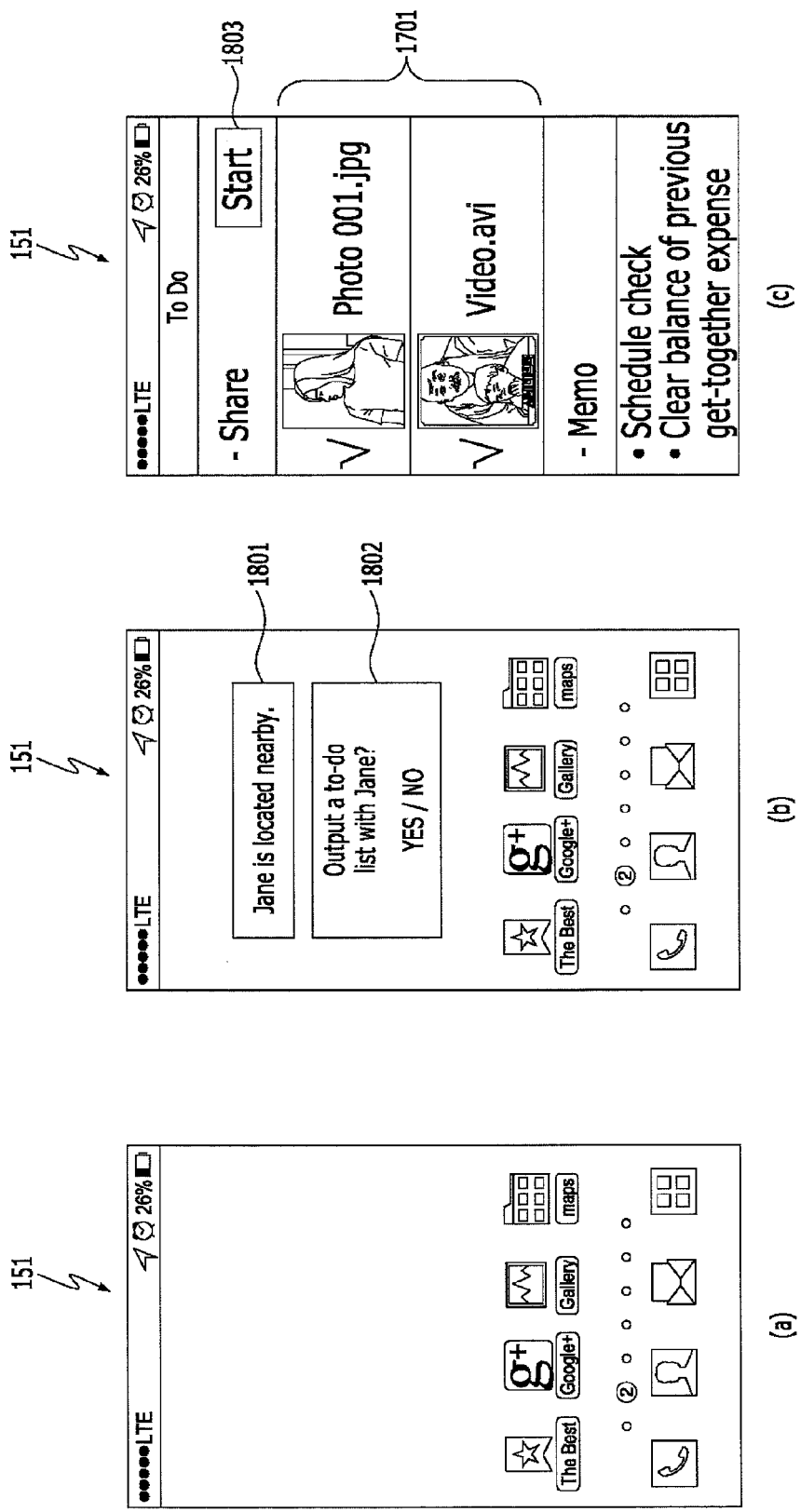
FIG. 18 is a diagram illustrating one example of a controlling method of outputting a to-do list for a prescribed counterpart terminal according to one embodiment of the present invention.

In the following description, a method of outputting the above-mentioned to-do list when encountering a prescribed counterpart is explained in detail with reference to FIG. 18. FIG. 18 is a diagram illustrating one example of a method of outputting a to-do list for a prescribed counterpart terminal according to one embodiment of the present invention.

Referring to FIG. 18 (a), the mobile terminal 100 currently outputs a home screen. While the home screen is output, if a prescribed counterpart terminal is detected as existing nearby, the controller 180 can output a popup window 1802 for querying whether to output a to-do list set in the prescribed counterpart terminal. In addition, the controller 180 can also output a popup window 1801 indicating that the prescribed counterpart terminal exists nearby.

If 'YES' is selected from the popup window 1802, the controller 180 can output a to-do list previously set with reference to FIG. 17. In the to-do list, after an item to be sent has been selected from the file list 1701 to be sent, if a send start button 1803 is selected, the controller 180 can start to send a selected file to the prescribed counterpart terminal. Meanwhile, according to the foregoing description of the embodiment of the present invention, it is proposed that a file to be sent is directly selected by a user. According to an embodiment described in the following, based on a recognized neighbor external terminal, it is proposed to automatically add a file to the file list 1701 to be sent.

Figure 19:
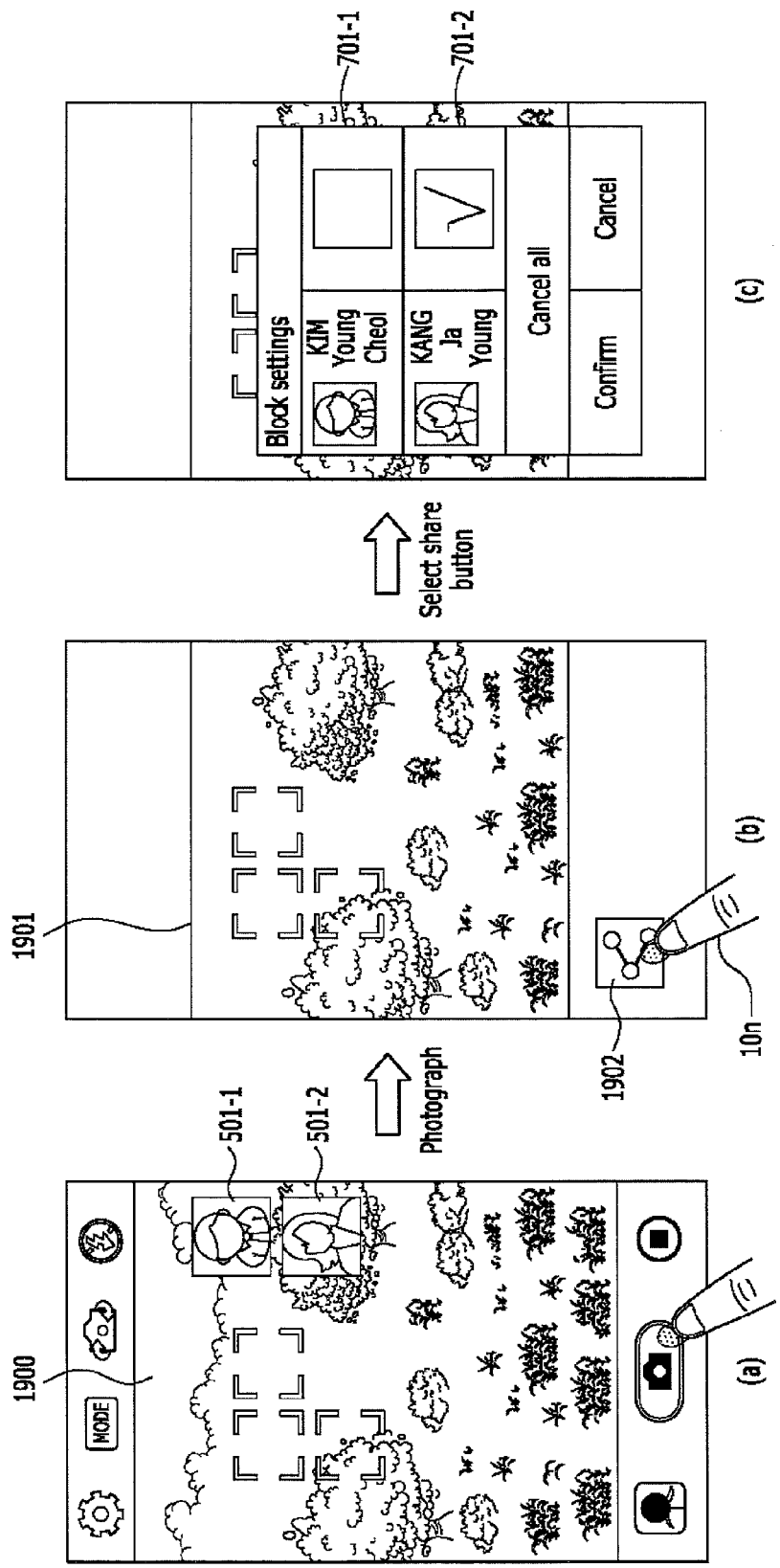
FIG. 19 is a diagram illustrating one example of a controlling method for automatically adding a photo taken through a camera to a file list to be sent according to one embodiment of the present invention.

FIG. 19 is a diagram illustrating one example of a method for automatically adding a photo taken through a camera to a file list to be sent according to one embodiment of the present invention. Referring to FIG. 19 (a), assume that the controller 180 has identified a first external terminal and a second external terminal. The controller 180 activates the camera 121 and outputs a photographing state diagram 1900 for the activated camera 121. In addition, the controller 180 outputs a first character 501-1 and a second character 501-2 corresponding to the identified first external terminal and the identified second external terminal through the photographing state diagram 1900, respectively.

If a photographing command 10m is received, the controller 180 takes a photo through the activated camera 121 and can then output a preview screen 1901 for the taken photo (FIG. 19 (b)). According to one embodiment of the present invention, the preview screen 1902 can output a share button 1902. If an input 10n of selecting the share button is received, the controller 180 can add the taken photo to a to-do list (i.e., the file list 1701 to be sent) for the currently identified first and second external terminals.

Alternatively, if an input 10n of selecting the share button is received, the controller 180 can output a popup window 1901 for designating a counterpart for sharing the taken photo. The popup window 1901 can output at least one or more character (or contact) items to be designated as a share counterpart. The at least one character (or contact) items can include check boxes 701-1 and 701-2, respectively. After the check box has been checked, if a confirm button is selected, the controller 180 can add the file list 1701 to be sent to the selected prescribed counterpart terminal.

Meanwhile, when a user participates in a special party or the like, when numerous photos related to the corresponding party are taken, since the taken photos are highly related to each other, it may be appropriate for the taken photos to be managed as a separate photo group. Hence, according to one embodiment of the present invention related to FIG. 20, based on an external terminal currently recognized nearby, a method of configuring highly-associated photos into a single photo group (or a single album) is proposed.

Figure 20:
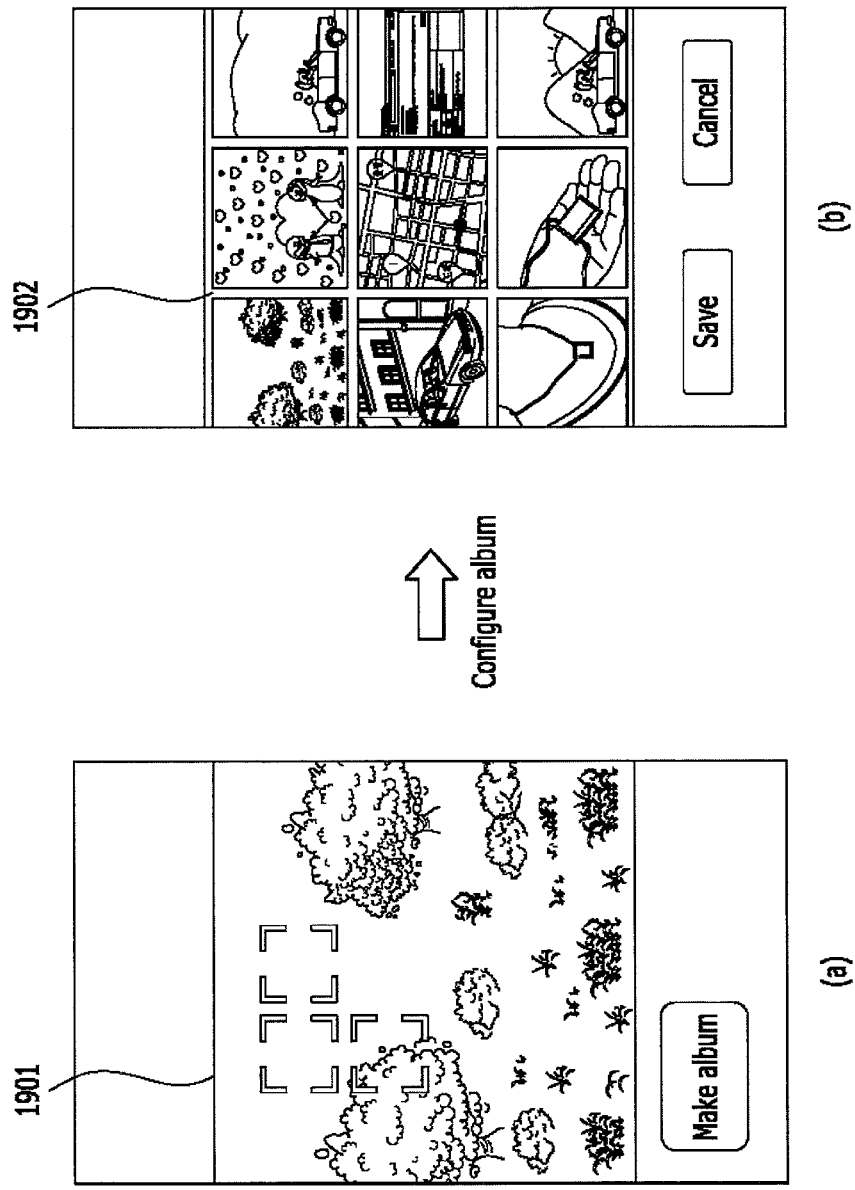
FIG. 20 is a diagram illustrating one example of a controlling method of configuring a photo group of a plurality of photos highly associated with a prescribed photo according to one embodiment of the present invention.

FIG. 20 is a diagram illustrating one example of a method of configuring a photo group of a plurality of photos highly associated with a prescribed photo according to one embodiment of the present invention. According to an embodiment described with reference to FIG. 20, it is proposed that inter-photo association is determined based on a recognized neighbor external terminal. In particular, an external terminal, which exists nearby when a photo is taken, is saved as a tag information related to the photo. In addition, photos having matched tag information are determined as similar photos.

For instance, if first to fifth external terminals exist in tag information saved in first to tenth photos, the controller 180 can configure the first to tenth photos into a single photo group. Although a portion of an external terminal is matched, if it is determined that there is association, photos can be configured into a single photo group as well as photos having an external terminal matched exactly. In particular, a first photo having first to tenth external terminals saved as tag information and a second photo having second and eleventh external terminals saved as tag information can be determined as having association in that most of the external terminals are in common.

Accordingly, embodiments of the present invention provide various effects and/or features. According to at least one of embodiments of the present invention, it is advantageous in that a security-enhanced notification can be output. According to at least one of embodiments of the present invention, it is advantageous in that a notification adaptive to a neighboring external terminal can be output.

It will be apparent to those skilled in the art that the present invention can be specified into other form(s) without departing from the spirit or scope of the inventions. The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). In addition, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen configured to output at least one display object;
a wireless communication unit configured to transceive data with at least one external terminal; and
a memory configured to store identification information of external terminals; and
a controller configured to:
transmit via the wireless communication unit, beacon signals to surroundings of the mobile terminal,
identify, via the wireless communication unit, a first external terminal existing within a predetermined communication distance from the mobile terminal based on the transmitted beacon signals,
if the identified first terminal matches the stored identification information in the memory of the mobile terminal, share data between the identified first terminal and the mobile terminal depending on applications, contents, and a profile of the identified first terminal set by the mobile terminal, and
if the identified first terminal does not match the stored identification information stored in the memory of the mobile terminal:
display a first display object in a first mode on the touch screen, when the first external terminal exists within the predetermined communication distance, and
display the first display object on the touchscreen in a second mode when the first external terminal is no longer within the predetermined communication distance,
wherein the first mode includes blocking, limiting, or altering information displayed on the touchscreen based on the stored identification information of the first external terminal, and
wherein the controller is configured to output and display different information depending on applications executed in the mobile terminal when the mobile terminal is in the first mode or the second mode.

2. The mobile terminal of claim 1, wherein the first display object comprises a notification indicator for identifying a prescribed notification.

3. The mobile terminal of claim 2, wherein in the first mode, the at least some of the information identified by the notification indicator is displayed on the touchscreen in a hidden form.

4. The mobile terminal of claim 2, wherein in the second mode, all information included identified by the notification indicator is displayed on the touchscreen.

5. The mobile terminal of claim 1, wherein the controller is further configured to:
identify a second external terminal is within the predetermined communication distance, and
display a second display object on the touchscreen corresponding to the second external terminal.

6. The mobile terminal of claim 5, wherein the second display object comprises a notification indicator of a text message received from the second external terminal.

7. The mobile terminal of claim 1,
wherein the controller is further configured to display a thumbnail list on the touchscreen for the stored at least one image data.

8. The mobile terminal of claim 7, wherein the first display object comprises a thumbnail image item on the thumbnail list, and
wherein the first mode is a mode for applying a prescribed filter effect to the thumbnail image item.

9. The mobile terminal of claim 8, wherein the prescribed filter effect comprises at least one of a mosaic effect and a blurred effect.

10. A method of controlling a mobile terminal, the method comprising:
storing in a memory of the mobile terminal, identification information of external terminals;
transmitting, via a wireless communication unit of the mobile terminal, beacon signals to surroundings of the mobile terminal;
identifying, via the wireless communication unit of the mobile terminal, a first external terminal existing within a predetermined communication distance from the mobile terminal based on the transmitted beacon signals;
if the identified first terminal matches the stored identification information in the memory of the mobile terminal, sharing data between the identified first terminal and the mobile terminal depending on applications, contents, and a profile of the identified first terminal set by the mobile terminal; and if the identified first terminal does not match the stored identification information stored in the memory of the mobile terminal:

displaying, via a touchscreen of the mobile terminal, a first display object in a first mode on the touch screen, when the first external terminal exists within the predetermined communication distance; and displaying the first display object on the touchscreen in a second mode when the first external terminal is no longer within the predetermined communication distance, wherein the first mode includes blocking, limiting, or altering information displayed on the touchscreen based on the stored identification information of the first external terminal, and wherein the method further comprises outputting and displaying different information depending on applications executed in the mobile terminal when the mobile terminal is in the first mode or the second mode.

11. The method of claim 10, wherein the first display object comprises a notification indicator for identifying a prescribed notification.

12. The method of claim 11, wherein in the first mode, the at least some of the information identified by the notification indicator is displayed on the touchscreen in a hidden form.

13. The method of claim 11, wherein in the second mode, all information included identified by the notification indicator is displayed on the touchscreen.

14. The method of claim 10, further comprising:
displaying a second display object on the touchscreen corresponding to the second external terminal.

15. The method of claim 14, wherein the second display object comprises a notification indicator of a text message received from the second external terminal.

16. The method of claim 10, further comprising:
displaying a thumbnail list on the touchscreen for the stored at least one image data.

17. The method of claim 16, wherein the first display object comprises a thumbnail image item on the thumbnail list, and
wherein the first mode is a mode for applying a prescribed filter effect to the thumbnail image item.

18. The method of claim 17, wherein the prescribed filter effect comprises at least one of a mosaic effect and a blurred effect.

* * * * *